(12) United States Patent
Kobayashi et al.

(10) Patent No.: US 7,903,324 B2
(45) Date of Patent: Mar. 8, 2011

(54) OPTICAL SWITCHING ELEMENT AND PHOTOADDRESSABLE DISPLAY MEDIUM USING THE SAME

(75) Inventors: Hideo Kobayashi, Ebina (JP); Takehito Hikichi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2338 days.

(21) Appl. No.: 10/638,296

(22) Filed: Aug. 12, 2003

(65) Prior Publication Data

US 2004/0105614 A1 Jun. 3, 2004

(30) Foreign Application Priority Data

Nov. 29, 2002 (JP) ................................. 2002-347789

(51) Int. Cl.
*G02F 1/29* (2006.01)
(52) U.S. Cl. ........................................................ 359/320
(58) Field of Classification Search .................. 359/320; 345/81, 97, 204, 206
See application file for complete search history.

(56) References Cited

U.S. PATENT DOCUMENTS

| | | | |
|---|---|---|---|
| 4,306,008 A | 12/1981 | Pai et al. | |
| 4,514,482 A | 4/1985 | Loutfy et al. | |
| 4,582,772 A | 4/1986 | Teuscher et al. | |
| 5,105,185 A * | 4/1992 | Nakanowatari et al. | 345/94 |
| 5,800,950 A | 9/1998 | Hirao et al. | |
| 6,600,473 B1 | 7/2003 | Kobayashi et al. | |
| 2001/0009417 A1 * | 7/2001 | Asai et al. | 345/204 |

FOREIGN PATENT DOCUMENTS

| | | |
|---|---|---|
| JP | A-61-124949 | 6/1986 |
| JP | A-62-242951 | 10/1987 |
| JP | A 2000-111942 | 4/2000 |

* cited by examiner

*Primary Examiner* — Jessica T Stultz
*Assistant Examiner* — Mahidere S Sahle
(74) *Attorney, Agent, or Firm* — Oliff & Berridge, PLC

(57) ABSTRACT

An optical switching element including at least a multi-layered optical switching layer that includes a charge generation layer and a charge transport layer wherein, the charge transport layer contains a charge transporting material represented by the following general formula (1). The optical switching element is applicable in a device, a photoaddressable display medium and a display device. The optical switching element may alternatively include a mono-layered optical switching layer that has a charge generating function and a charge transporting function, wherein the mono-layered optical switching layer contains the charge transporting material represented by the following general formula (1).

General formula (1)

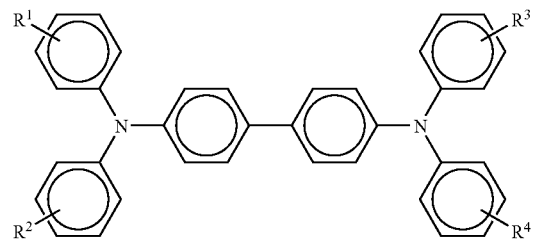

12 Claims, 14 Drawing Sheets

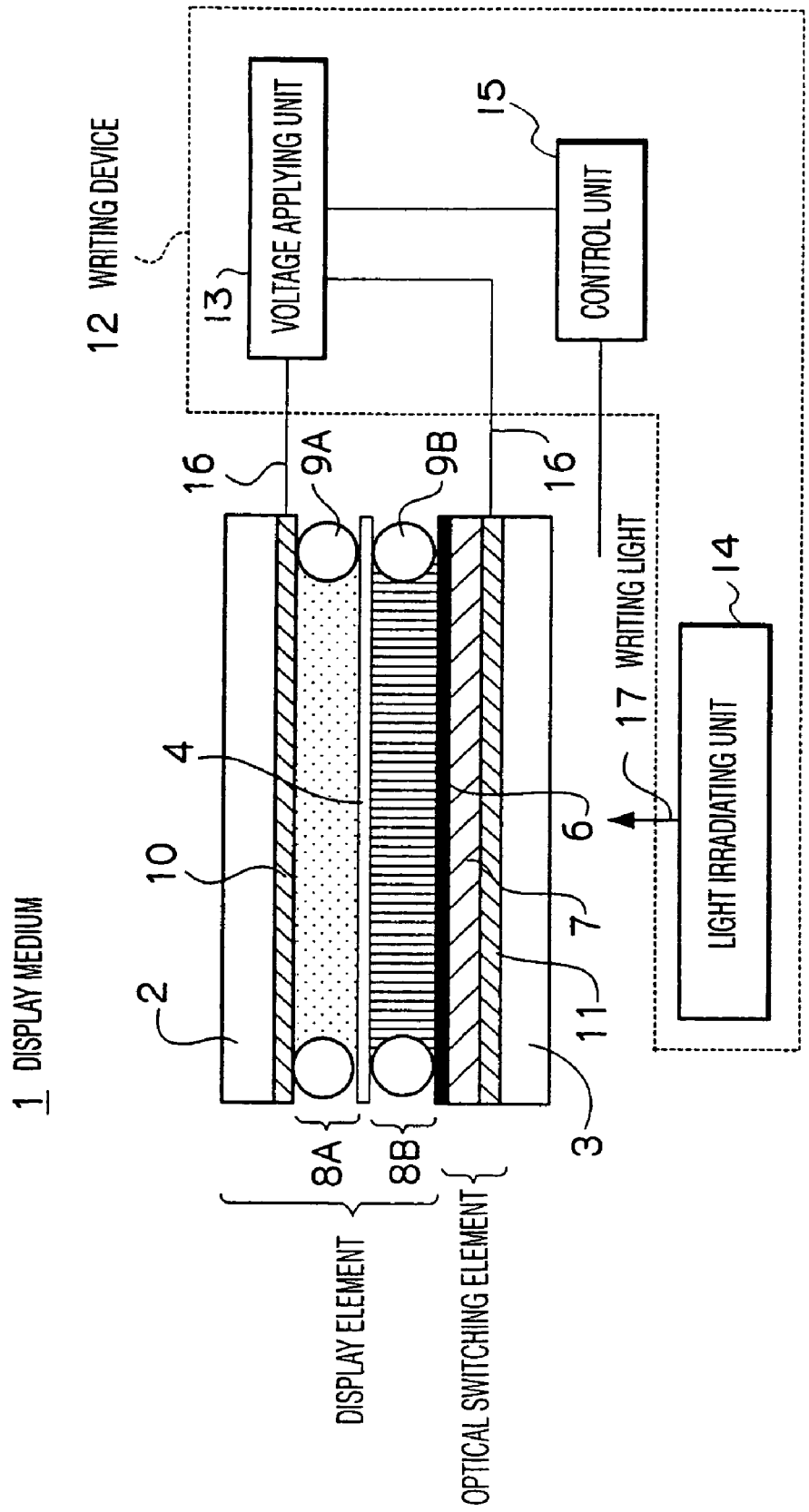

F I G. 3A  PLANAR
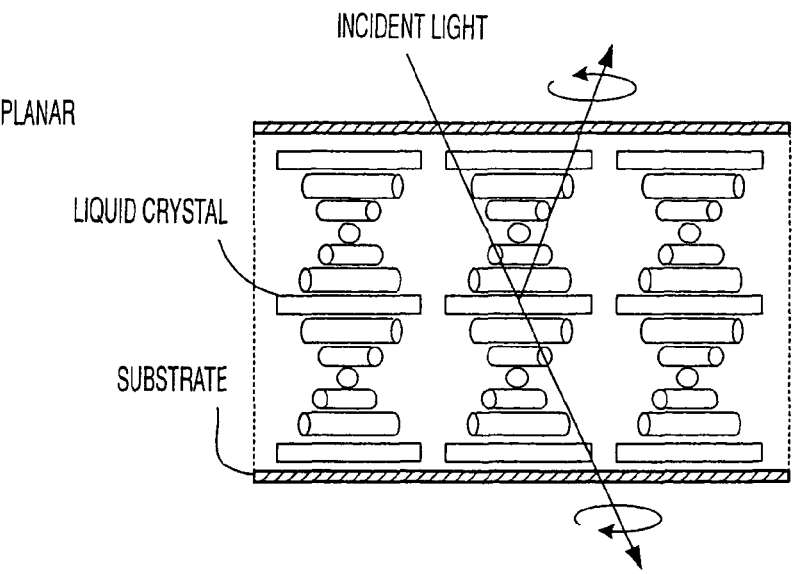
F I G. 3B  FOCAL CONIC
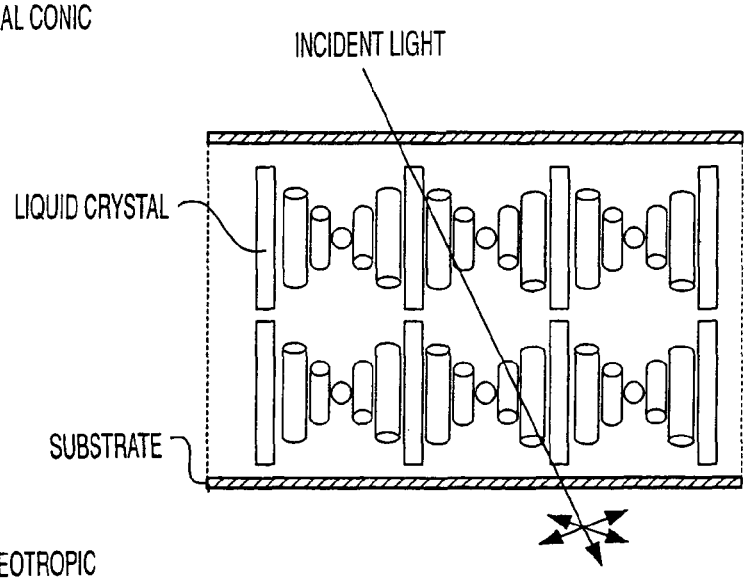
F I G. 3C  HOMEOTROPIC
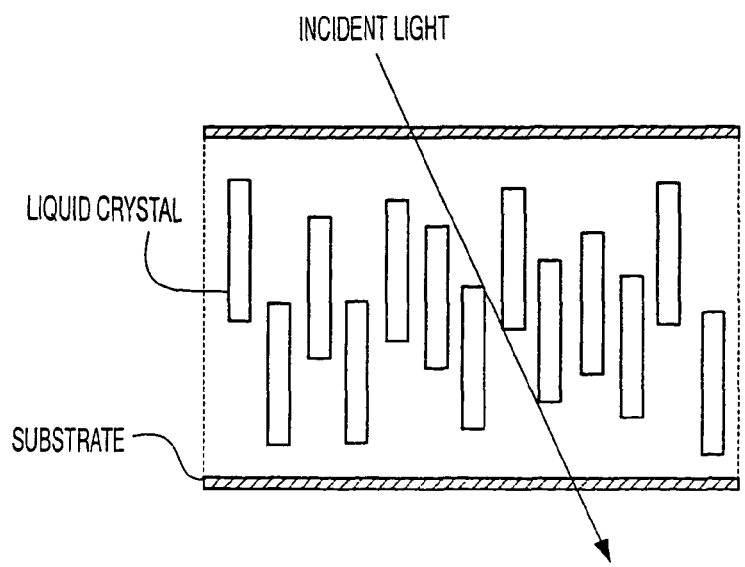

F I G. 7 A
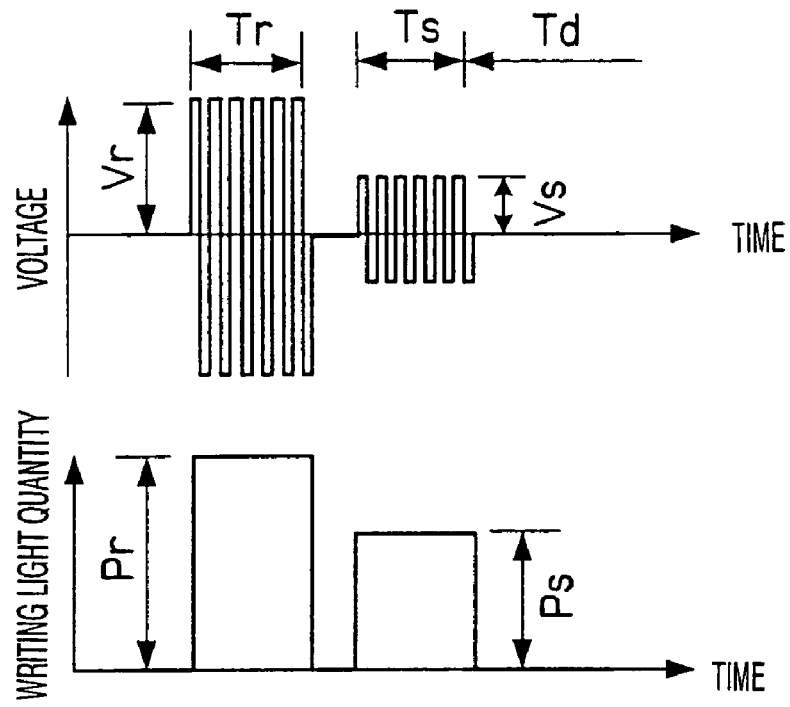
F I G. 7 B
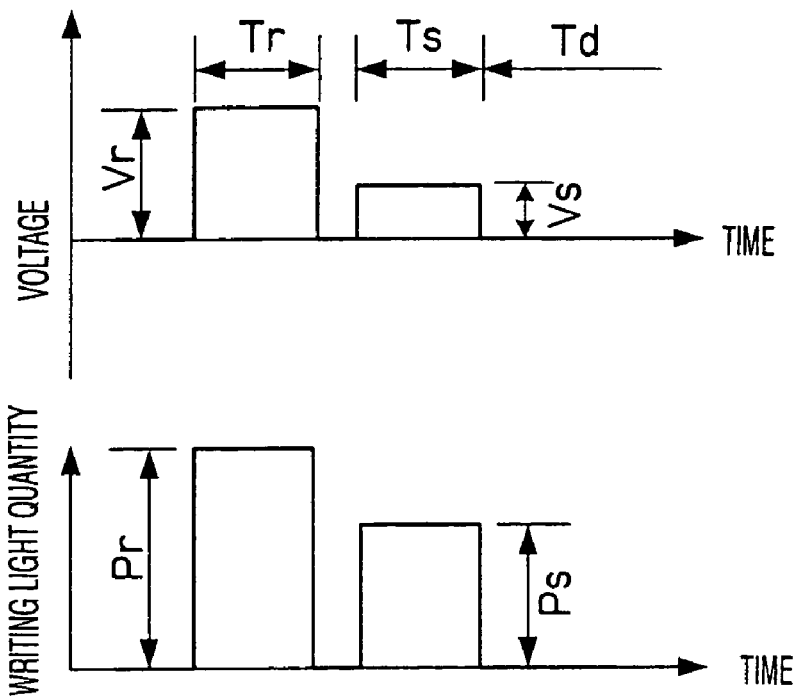

| | | TRANSMITTANCE Trt OF LIGHT MODULATING ELEMENT IN REFRESH PERIOD Tr (BIAS VOLTAGE Vr=V1) | |
|---|---|---|---|
| | | Td(Vd) | Te(Ve) |
| TRANSMITTANCE Tst OF LIGHT MODULATING ELEMENT IN SELECT PERIOD Ts (BIAS VOLTAGE Vs=V2) | Ta(Va) | p/f | p/p |
| | Tb(Vb) | f/f | f/p |

L LAYER / H LAYER (1) YELLOW    (2) BLACK    (3) GREEN    (4) RED

PRIOR ART

PRIOR ART

OPTICAL SWITCHING ELEMENT AND PHOTOADDRESSABLE DISPLAY MEDIUM USING THE SAME

CROSS-REFERENCE TO RELATED APPLICATION

This application claims priority under 35 USC 119 from Japanese Patent Application No. 2002-347789, the disclosure of which is incorporated by reference herein.

BACKGROUND OF THE INVENTION

1. Field of the Invention

The present invention relates to an optical switching element and to a device, a photoaddressable display medium, and a display device each using the optical switching element.

2. Description of the Related Art

In recent years, photoaddressable spatial modulator devices have been developed in which a photoconductive switching element and a display element are combined. Such devices are in actual use as a light bulb of projectors or the like and have been investigated for potential use in the field of optical information processing as disclosed in "Ekisho Kukan Henchoki to Joho-Shori" in Japanese (Liquid Crystal Spatial Modulator and Information Processing), Ekisho (Liquid Crystal), Vol. 2, No. 1, 1998, pp 3-18.

In the photoaddressable spatial modulator device, the display element is driven to form display images by applying a certain voltage to the element, allowing the photoconductive switching element to change in impedance depending on the amount of received light, and controlling the voltage applied to the display element.

In particular, there is a medium, in which a display element having a memory effect and a photoconductive switching element are layered, and the medium is addressable (writable) by applying voltage and optical image input. Such a medium has attracted attention as an electronic paper medium, which can be carried without carrying a writing device with it.

Examples of the display element that has been investigated for the photoaddressable medium include liquid crystal display elements such as those using a cholesteric liquid crystal or a ferroelectric liquid crystal, an electrophoretic element, an electrorotation element, a toner electrotransfer element, and an encapsulated element of these.

Examples of the optical switching element that can control voltage or current depending on the amount of received light include an amorphous silicon element used in the field of electrophotography, an OPC element that has a function separation type double-layer structure using an organic photoconductor, and an OPC element investigated by the inventors that has a structure including a carrier transporting layer (CTL) and carrier generating layers (CGLs) provided on both sides of the CTL (hereinafter referred to as a dual CGL structure). In particular, the OPC elements can advantageously be formed in a flexible substrate such as a PET film since they do not require a heat treatment at high temperature. Moreover, they can be manufactured at low cost since they do not require a vacuum process. The dual CGL structure is particularly advantageous, because it can be driven by alternating current and because even a liquid crystal element used as the display element can resist generating image-sticking phenomenon, which would otherwise be caused by ion transfer under the bias component included in the applied voltage. The carrier used for driving may be positive or negative.

FIG. 15 schematically shows a photoaddressable electronic paper (a photoaddressable display medium) utilizing the optical switching element.

The display medium 100 comprises a pair of substrates 102, electrodes 101 each formed on the surface of each substrate, and a display layer 104 (a display element) and an optical switching layer 106 (an optical switching element) both connected to the electrodes, respectively, and layered and sandwiched between the substrates 102. While a pulse voltage is applied to the display medium 100 from writing pulse applying means 110, light is applied from an optical writing unit 108 based on image information, allowing the display medium 100 to display images.

Use of cholesteric liquid crystal in the photoaddressable system has been proposed for colorization of the photoaddressable electronic paper (photoaddressable display medium). Among color electronic paper technologies, this system can display additive color mixtures by lapping RGB without using color filters two-dimensionally to exhibit colors such as RGB. This system therefore has got into the limelight as a promising technology. For practical use of such a color display system, for example, Japanese Patent Application Laid-Open (JP-A) No. 2000-111942 proposes a color display medium using a cholesteric liquid crystal display element.

In the color display medium using the cholesteric liquid crystal display element as disclosed in JP-A No. 2000-111942, however, the conventional optical switching element has had a problem that its switching performance is insufficient in low electric field. As shown by the dependence of the resistance component on AC voltage in FIG. 16, the conventional optical switching element can offer only significantly degraded on/off switching performance in an electric field of 10 V/µm or lower.

In the photoaddressable electronic paper using cholesteric liquid crystal capsules, a voltage of about 250 $V_{op}$ is generally applied to the medium to form display images from applied optical images, as disclosed in SID INTERNATIONAL SYMPOSIUM DIGEST of TECHNICAL PAPAERS, June 2001, "A Novel Photoaddressable Electronic Paper Utilizing Cholesteric LC Microcapsules and Organic Photoconductor." As recited in this report, the threshold values of the display layer and integrated medium should be about 200 V and about 250 V, respectively, and about 50 V should be applied to the switching element. The thickness of the optical switching layer in the medium is about 3 µm, and therefore, an electric field of about 13 V/µm should be applied to the switching element. The optical switching element can have a brightness ratio of about 50 in an applied electric field of 10 V/µm or higher, and thus, the switching on/off margin is sufficient.

In the color display medium using the cholesteric liquid crystal display element such as disclosed in JP-A No. 2000-111942, an electric field of 10 V/µm or higher is generally applied to the optical switching layer (the photoconductive layer) when the voltage is applied to achieve Vfh 10 or Vfh 90, but an electric field of 10 V/µm or lower, generally about 3 V/µm is applied to the optical switching layer (the photoconductive layer) when the voltage is applied to achieve Vpf 10 or Vpf 90. In a color display, brightness switching at Vpf 10 or Vpf 90 is required of the optical switching layer (the photoconductive layer) (see FIG. 16 of JP-A No. 2000-111942). As shown in FIG. 16, however, the performance of the optical switching generally used in SID is poor in an electric field of 10 V/µm or lower, and the brightness on/off ratio of the resistance component is apparently too small. Thus, color switching cannot be performed sufficiently by the conventional color display medium.

The problem is that the bright time can have no assured photoconductivity or no reduced resistance in low electric field applied, although the dark time can have high resistance as well as high electric field. If it should be driven, the resistance value per unit of film thickness has to be reduced, for example, to about 2 MΩ or less.

Even in a monochrome medium, when a cholesteric liquid crystal display element is used, a system may be used in that a high electric field is once applied to form a highly reflective planar domain at the front face, and then the planar domain is selectively made a low reflective focal conic. In such a system, the optical switching element also has to be driven in low electric field, because the electric field is used to change the phase from the planar phase to the focal conic phase.

In a display medium using the cholesteric liquid crystal display element, therefore, the optical switching element has to be driven over a wide electric field range from high to low. Thus, there has been a demand for improvement in this respect.

In the display medium using an electrochromic or electro liquid powder display element, the threshold itself is low, and therefore, low electric field is needed for driving. Though the optical switching element does not have to be driven over a wide electric field range from high to low in such a case, the optical switching element must be driven in low electric field, and therefore, there has been a demand for improvement in this respect.

SUMMARY OF THE INVENTION

The present invention has been made in order to solve the problems with the above conventional technologies and to achieve the object below. It is an object of the invention to provide an optical switching element that has an improved optical switching function in low electric field and can offer a good performance of on/off driving over an electric field range from high to low. It is also an object of the invention to provide a device, a photoaddressable display medium and a display each using such an optical switching element.

The above problems can be solved by the invention as described below.

The invention provides an optical switching element, including at least: a multi-layered optical switching layer that includes a charge generation layer and a charge transport layer; or a mono-layered optical switching layer that has a charge generating function and a charge transporting function, wherein the charge transport layer or the mono-layered optical switching layer contains a charge transporting material represented by the following general formula (1):

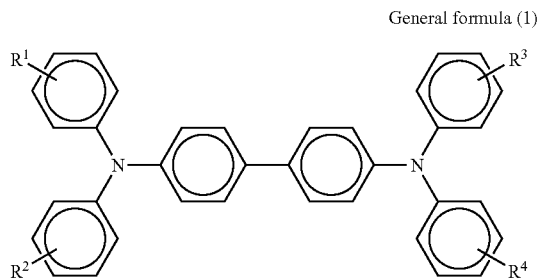

General formula (1)

In general formula (1) $R^1$ and $R^3$ each independently represent $CH_3$ or $C_2H_5$, and $R^2$ and $R^4$ each independently represent H, $CH_3$ or $C_2H_5$.

The invention also provides a device, a photoaddressable display medium, and a display device each using the optical switching element of the present invention.

BRIEF DESCRIPTION OF THE DRAWINGS

FIG. 2 is a schematic diagram showing a first embodiment of a photoaddressable display medium and an image writing device according to the invention.

FIGS. 3A to 3C are diagrams showing changes in the orientation of a cholesteric liquid crystal.

FIGS. 7A and 7B are diagrams showing writing signals in a method for writing image to the photoaddressable display medium according to the invention.

DETAILED DESCRIPTION OF THE INVENTION

Figure 1:
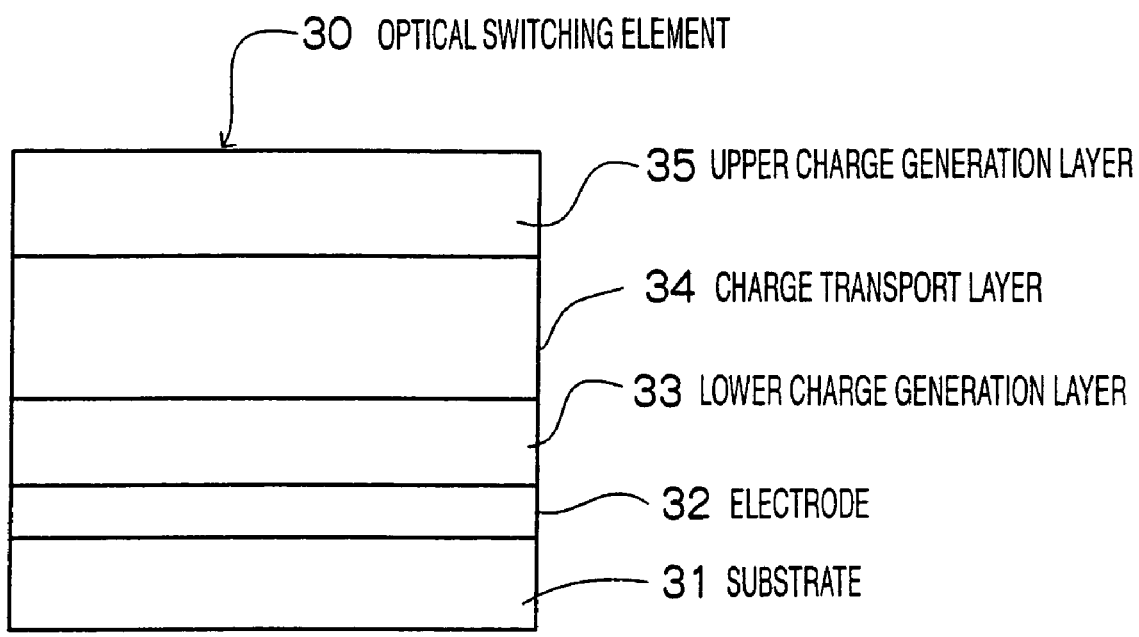
FIG. 1 is a schematic diagram showing an embodiment of the optical switching element according to the present invention.

The present invention is described in detail below.

The optical switching element according to the invention includes at least: a multi-layered optical switching layer that includes a charge generation layer and a charge transport layer; or a mono-layered optical switching layer that has a charge generating function and a charge transporting function. In such a structure, the charge transport layer or the mono-layered optical switching layer contains a charge transporting material represented by the following general formula (1), so that the device has an improved optical switching function in electric field and can offer a good performance of on/off driving over an electric field range from high to low.

It is not absolutely clear why the optical switching element containing the charge transporting material represented by general formula (1) in the charge transport layer or the mono-layered optical switching layer can offer a good performance even in low electric field. However, it can be assumed as follows. The charge transporting material represented by general formula (1) has a shallow ionization potential. Therefore, such a material may make it easier to inject a charge from the charge generation layer to the charge transport layer (or within the layer in a mono-layered type) in low electric field. The mobility and the dependence of the charge transporting material on electric field may also be improved by the influence of the molecular-level alignment of the charge transporting material and the like.

In the charge transporting material represented by general formula (1), the substituents $R^1$ to $R^4$ on the four side benzene rings may each be in the para position. In such a specific case, a higher ionization potential is provided so that the mobility and the dependence on electric field can be more effectively improved. In particular, therefore, the charge transporting material represented by general formula (1) is preferably the material represented by the following general formula (2).

If the substituents $R^1$ to $R^4$ on the four side benzene rings in the charge transporting material represented by general formula (1) or (2) are each an alkyl group having a higher molecular weight than that of $C_2H_5$, the mobility may be reduced. It is believed that the degree of free vibration of the alkyl group increases as the alkyl group bonded as the side chain becomes longer than $C_2H_5$, which increases the free volume, and that the resulting extended intermolecular distance leads to a reduction in the probability of holes hopping from a certain CTM molecule to the neighboring CTM molecule and finally leads to a reduction in the mobility. In addition, the increase in free volume can lead to an increase in vibration when heated, and the glass transition temperature Tg can be lowered. If the material has a low glass transition temperature, it may easily br deformed in a heating or drying process. The resulting film may significantly vary in thickness or can be curled and at worst, cannot work in the medium.

The optical switching element according to the invention is also effective at reducing the electric power consumption, because it can offer a good performance of on/off driving in low electric field.

General formula (1)

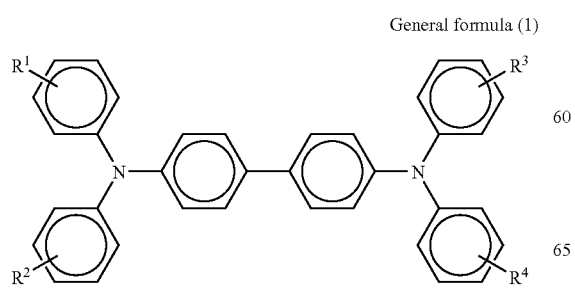

General formula (2)

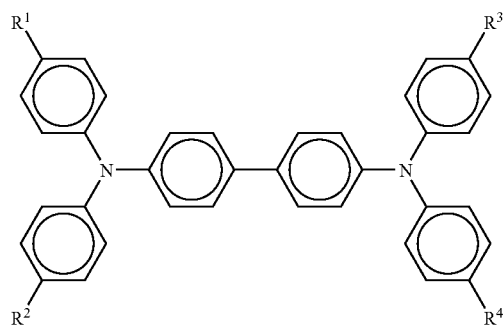

In general formula (1) and (2), $R^1$ and $R^3$ each independently represent $CH_3$ or $C_2H_5$, and $R^2$ and $R^4$ each independently represent H, $CH_3$ or $C_2H_5$.

It is preferable that $R^1$ and $R^3$ each represent $CH_3$, and $R^2$ and $R^4$ each represent $C_2H_5$ in general formula (1) or (2).

In general formula (1) or (2), the four side benzene rings may each have any additional substituent such as an alkyl group, for example, for the purpose of improving solubility in a solvent. Such addition of any substituent can be accompanied by a change in ionization potential and therefore should be made not so as to degrade the low-voltage driving performance.

Examples of the charge transporting compound represented by general formula (1) (or the charge transporting material represented by general formula (2)) are shown below (as Compounds 1 to 18), but such examples are not intended to limit the scope of the invention.

1

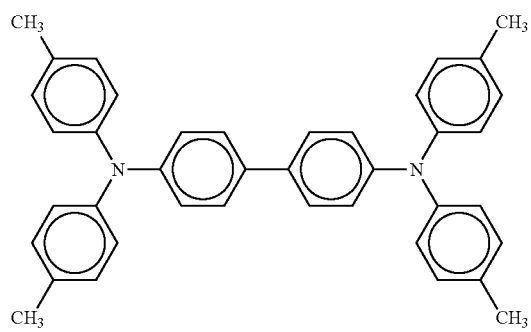

2

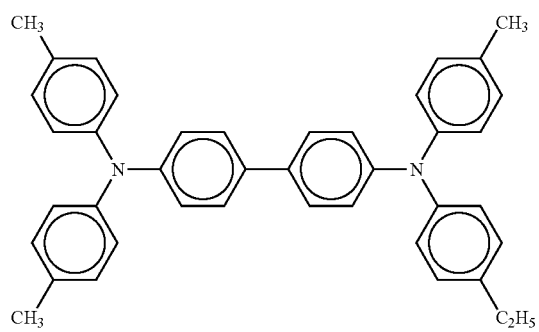

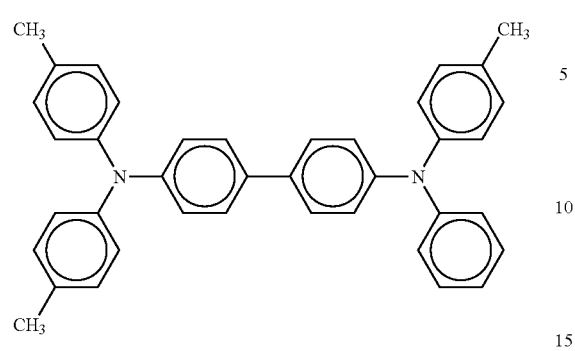
3
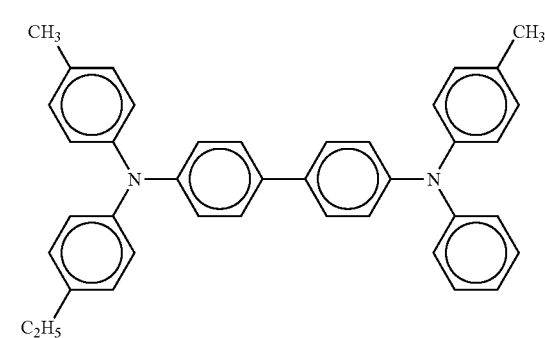
7
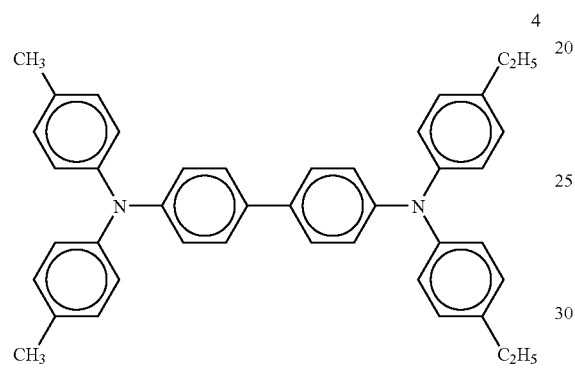
4
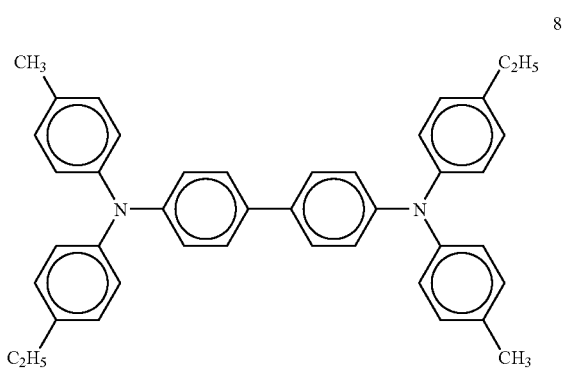
8
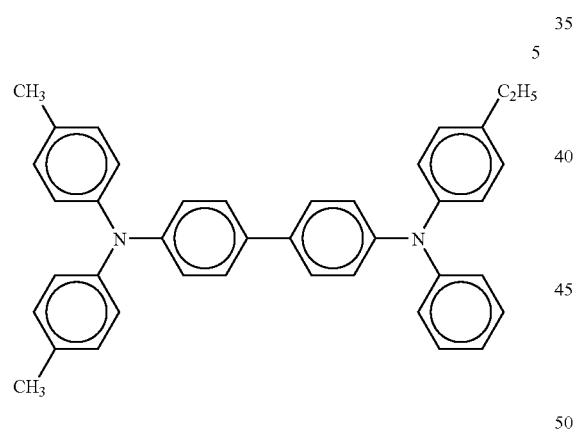
5
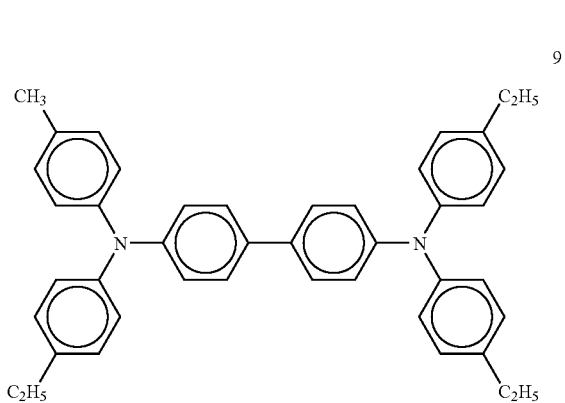
9
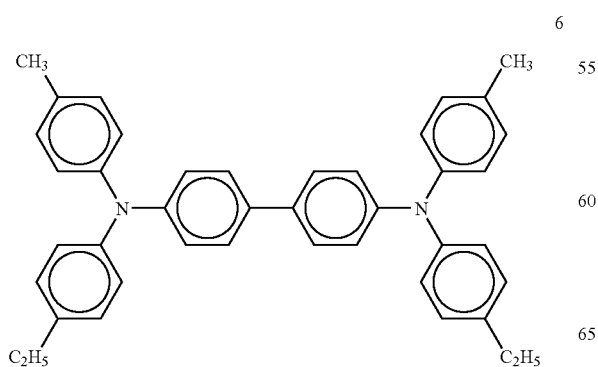
6
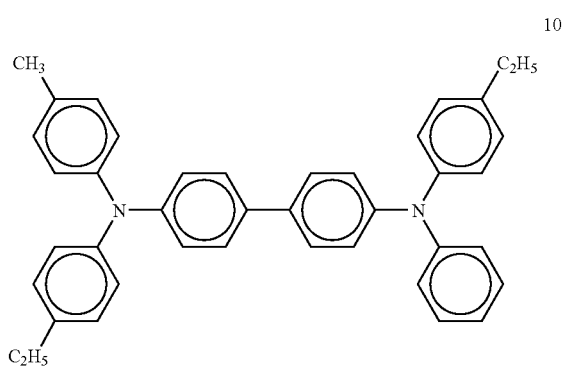
10

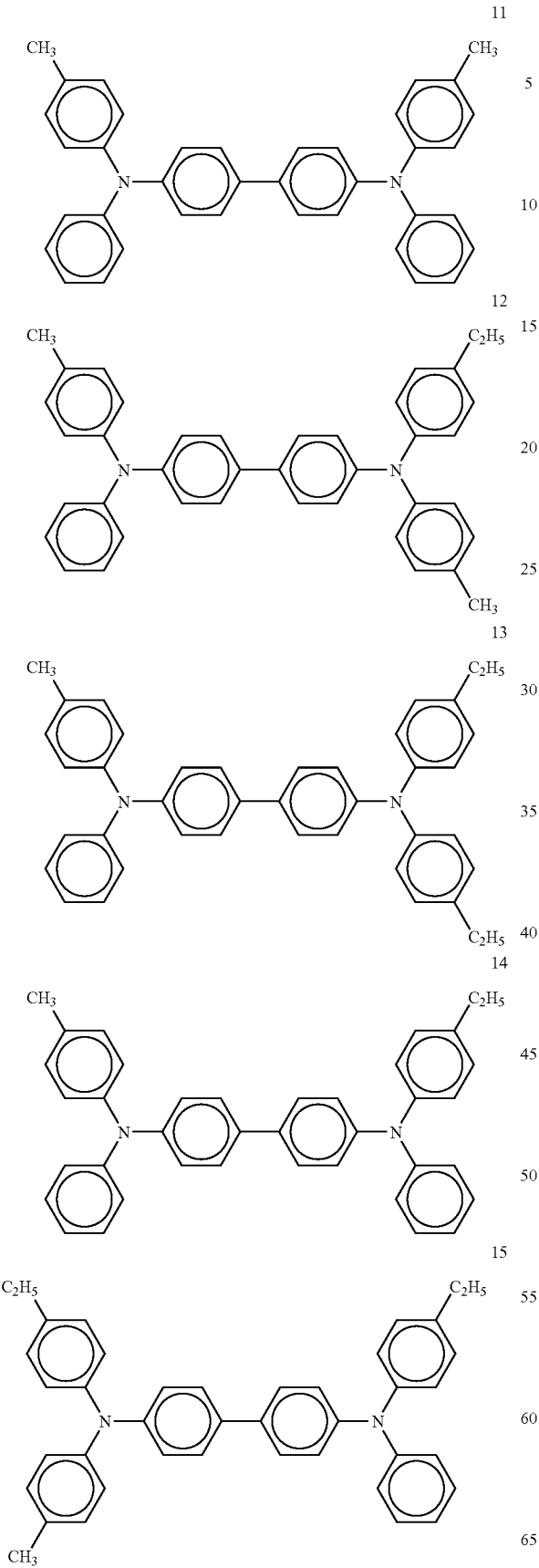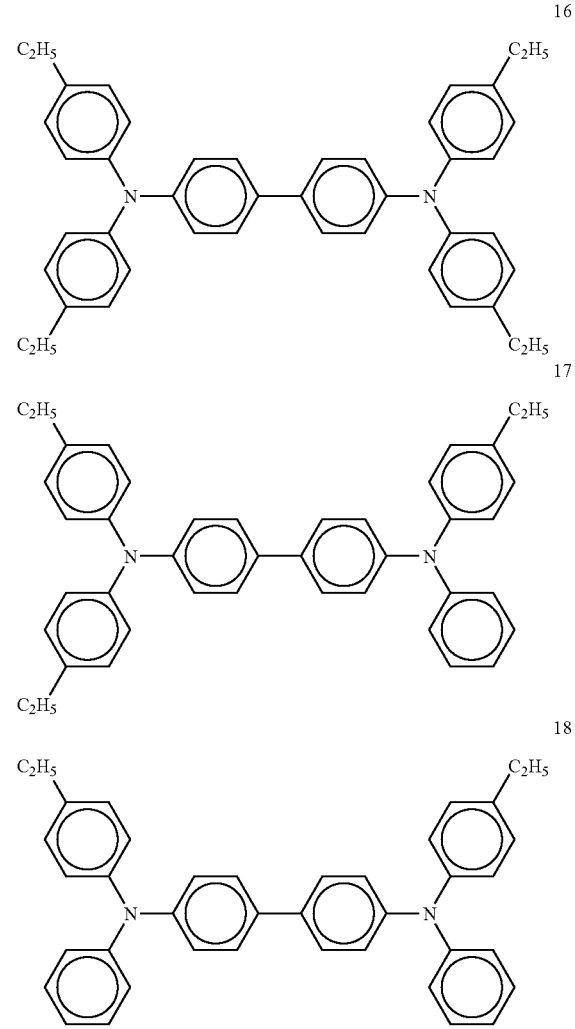

The invention is more specifically described by referring figures below.

Optical Switching Element

Referring to FIG. 1, the optical switching element according to the invention is described below. An optical switching element 30 (a dual CGL structured optical switching element) as shown in FIG. 1 includes a substrate 31 provided with an electrode 32 (an electrically conductive film) and an optical switching layer (a photoconductive layer) comprising a lower charge generation layer 33, a charge transport layer 34 and an upper charge generation layer 35 which are disposed in this order on the substrate 31. In the device or the photoaddressable display medium as described below, the upper charge generation layer 35 is disposed on the side of a function layer such as a display layer.

As described above, the charge transport layer 34 comprises the charge transporting material represented by general formula (1). The charge transporting material may be used alone or in combination with another charge transporting material. When any other charge transporting material is used in combination, the ratio of the charge transporting material represented by general formula (1) (the main component) to the other charge transporting material(s) (based on the total percentage 100% by weight of the charge transporting materials) is preferably 60% by weight or more, more preferably 80% by weight or more, further more preferably from 90% to 100% by weight.

The concentration of the charge transporting material in the charge transport layer 34 may be 30% to 90% by weight, preferably 45% to 80% by weight, and more preferably 50% to 70% by weight. The solid content of a mixture of the charge transporting material and a binder is preferably 30% SC or less and more preferably 25% SC or less when the content in the CTL is 55% to 75% by weight. Outside the range, the CTM can be crystallized in the solution to cause coating failure.

Examples of the binder used in the charge transport layer 34 include polycarbonate, polyarylate, polyester, polystyrene, a styrene-acrylonitrile copolymer, polysulfone, polymethacrylate, and styrene-methacrylate ester. The concentration of the binder in the CTL is effectively 10% to 70% by weight.

Examples of the solvent for use in the coating liquid for forming the charge transport layer 34 include aromatic hydrocarbons such as benzene, toluene, xylene, and monochlorobenzen; cyclic or straight chain ethers such as tetrahydrofuran and ethyl ether; ketones such as acetone and 2-butanone; and halogenated aliphatic hydrocarbons such as methylene chloride, chloroform and ethylene chloride. The concentration of the solvent is preferably 70% SC or more.

Besides the charge transporting material, any charge generating material as shown below may accessorily be added to the charge transport layer 34. Applicable examples of the auxiliary charge generating material include a trinitrofluorene type, a polyvinylcarbazole type, an oxadiazole type, a hydrazine type such as benzylamino hydrazine and quinoline hydrazine, a stilbene type, a triphenylamine type, a triphenylmethane type, and a benzidine type.

Examples of the charge generating material for use in the upper and lower charge generation layers 35 and 33 include metal or nonmetal phthalocyanine, squalium compounds, azulenium compounds, perylene pigments, indigo pigments, azo pigments such as bisazo and trisazo pigments, quinacridone pigments, pyrrolopyrole pigments, polycyclic quinone pigments, condensed ring aromatic pigments such as dibromoanthanthrone, cyanine pigments, xanthene pigments, a charge-transfer complex such as polyvinylcarbazole and nitrofluorene, and a eutectic complex composed of a pyrylium salt dye and a polycarbonate resin. The charge generating material preferably contains any one of the phthalocyanines: chlorogallium phthalocyanine, hydroxygallium phthalocyanine and titanyl phthalocyanine, or any mixture thereof, as a main component.

A particularly preferred crystal structure of the hydroxygallium phthalocyanine has strong diffraction peaks in X-ray diffraction spectrum at Bragg angles (2θ±0.2°) of (i) 7.5°, 9.9°, 12.5°, 16.3°, 18.6°, 25.1°, and 28.3°; (ii) 7.7°, 16.5°, 25.1°, and 26.6°; (iii) 7.9°, 16.5°, 24.4°, and 27.6°; (iv) 7.0°, 7.5°, 10.5°, 11.7°, 12.7°, 17.3°, 18.1°, 24.5°, 26.2°, and 27.1°; (v) 6.8°, 12.8°, 15.8°, and 26.0°; or (vi) 7.4°, 9.9°, 25.0°, 26.2°, and 28.2°. Such a crystal structure can generate charges at high efficiency.

A particularly preferred crystal of the chlorogallium phthalocyanine has strong diffraction peaks in X-ray diffraction spectrum at Bragg angles (2θ±0.2°) of at least 7.4°, 16.6°, 25.5°, and 28.3°; or 6.8°, 17.3°, 23.6° and 26.9°; or 8.7° to 9.2°, 17.6°, 24.0°, 27.4°, and 28.8°. Such a crystal of the chlorogallium phthalocyanine can generate charges at high efficiency. The ionization potential of these materials is about 5.4 eV. A crystal structure of the titanyl phthalocyanine that has diffraction peaks in X-ray diffraction spectrum at Bragg angles (2θ±0.2°) of 9.5°, 9.7°, 11.7°, 15.0°, 23.5°, 24.1°, and 27.3° can generate charges at high efficiency and is therefore particularly preferred.

Examples of the material for the substrate 31 include glass, PET (polyethylene terephthalate), PC (polycarbonate), polyethylene, polystyrene, polyimide, and PES (polyethersulfone). When an organic material is used for the optical switching layer (the charge generation layer and the charge transport layer), heat treatment at high temperature is not performed. In such a case, therefore, an optically transparent plastic substrate is advantageously used in terms of the resulting flexible substrate, easy molding, and cost.

In general, the substrate 31 preferably has a thickness of 100 μm to 500 μm.

An ITO film, Au, SnO$_2$, Al, Cu, or the like may be used for the electrode 32.

The substrate 31 and the electrode 32 are not necessarily optically transparent. As disclosed in Japanese Patent Application No. 11-273663, if the display element of the photoaddressable display medium has a memory effect and is a selective reflection type that selectively reflects the wavelengths necessary for display or a backscattering type, writing is possible from the display side. In such a case, only the substrate 31 and the electrode 32 on the display element side have to be optically transparent. When photo-addressing (optical writing) is performed from the display element side, therefore, the substrate 31 and the electrode 32 of the optical switching element 30 does not have to be optically transparent, and for example, an Al layer may be used for the electrode 32.

In the optical switching element 30, the charge generation layers 35 and 33 provided on and under the charge transport layer 34 may not be equal in photoconductive property. In such a case, as disclosed on paragraphs [0022] to [0025] of JP-A No. 2000-180888, a functional film having such a capacitance component that the DC component can be eliminated, namely a functional film for eliminating the DC component, may be provided in the optical switching element 30 in order to effectively eliminate the DC bias.

Besides the functional film for eliminating the DC component, any other functional layer may be provided. For example, a layer for preventing carries from rushing in the place between the electrode and the charge generation layer may be formed. A reflective film or an absorption film may also be formed, or a functional film having these different functions may also be provided. Such a functional layer may be used, as far as it does not significantly interfere with the current flow.

The structure of the optical switching layer in the optical switching element 30 is not limited to the above. A charge generation layer may be provided between charge transport layers, and therefore, the optical switching layer may have the structure of charge generation layer/charge transport layer/charge generation layer/charge transport layer/charge generation layer or the like. Additionally, the optical switching layer is not limited to the multi-layered optical switching layer including the structure of charge generation layer/charge transport layer and may be a mono-layered optical switching layer having a charge generating function and a charge transporting function. When the monolayer is used, the charge transporting material represented by general formula (1) is contained in the mono-layered optical switching layer.

Devices

Devices utilizing the optical switching element of the invention are described below. The optical switching element of the invention may be electrically connected to any functional element to form a device. The optical switching element and the functional element may be connected in series or in parallel or in combination thereof. Any other element may further be connected. As described above, the optical switching element of the invention can offer a good performance of on/off driving in an electric field range from high to low. Therefore, various functional elements can be applied, and the electrical power consumption can be reduced.

Examples of the functional element include display elements such as a liquid crystal display element for image display, an electrochromic element, an electrophoretic element, and an electrorotation element; and elements other than the image display element such as a spatial modulator element and an optical computing element; memory elements for storage devices; and image recording elements for thermal head. Particularly, the optical switching element of the invention is effective for switching of the image display element, specifically the liquid crystal display element. The liquid crystal display element may be used as a photoaddressable liquid crystal spatial modulator element. Since the liquid crystal display device is basically driven by alternating current, the optical switching element of the invention can be effectively applied to it. Available examples of the liquid crystal include a nematic liquid crystal, a smectic liquid crystal, a discotic liquid crystal, a cholesteric liquid crystal, and the like. The display element using the cholesteric liquid crystal is particularly preferred, because it requires the optical switching element to be driven on/off over an electric field range from high to low as described above.

The functional element may have a memory effect. Examples of the functional element having a memory effect include a liquid crystal display element having a memory effect. The liquid crystal display element having a memory effect is characterized in that the orientation of the liquid crystal is maintained for a certain time period even after the application of the voltage for controlling it is stopped. Examples of the liquid crystal include a polymer dispersion type liquid crystal (PDLC), a ferroelectric liquid crystal such as a chiral smectic C phase, a cholesteric liquid crystal, and the like. Such a liquid crystal may be encapsulated and applied in the liquid crystal element. The liquid crystal having the a memory effect does not need electric power for holding the display image and can be formed in an integrated device and then separated from the main part for use. Such a device can be manufactured at low cost.

Besides the liquid crystal display elements, other examples of the display element having a memory effect include an electrochromic element, an electrophoretic element, and an electrorotation element.

The optical switching element and the functional element connected thereto are preferably integrated into a device. Such integration can stabilize the connection between the optical switching element and the functional element. Integration of the functional element having the memory effect and the optical switching element is particularly effective. The device with these elements integrated can be separated from the main part for driving it. For example, the separated device can be distributed. The user can read it at any place in any pose. Of course, only the liquid crystal image display part can be separated for use. However, reconnection between the functional element and the optical switching element has some difficulty in assuring the reliability. Therefore, the integration of the functional element and the optical switching element is more effective.

The device (display medium) comprising a liquid crystal element having a memory effect as a functional element and an optical switching element integrated therewith is particularly advantageous in the invention. In particular, a device comprising a cholesteric liquid crystal display element having a memory effect and an optical switching element integrated therewith is preferably used for the image display medium, because the cholesteric liquid crystal has a high reflectance and gives a good display performance.

In the invention, the optical switching element, the functional film for eliminating the direct current component, and the functional element are advantageously layered in order and integrated into a device. In the device comprising the optical switching element and the functional element connected in series, the functional film may be provided between the upper charge generation layer of the optical switching element and the functional element. Examples of the functional film include a separation film for separating the optical switching element from the functional element and the functional film for eliminating the DC component.

Photoaddressable Display Medium and Display

An example of the integration of the optical switching element and the functional element is shown below. FIG. 2 specifically shows a system (display) including a photoaddressable color display medium that employs the cholesteric liquid crystal for four-color display and an image writing device. In this embodiment, the image writing device comprises means for driving the display medium and means for optically writing to the display medium.

A display medium 1 includes substrates 2 and 3; bias electrodes 10 and 11 formed on the inner surface of the substrates 2 and 3, respectively; two display layers 8A and 8B each comprising a cholesteric liquid crystal that selectively reflects visible light beams of a color that is different from the color of the visible light beams selectively reflected by any other one of the plurality of display layers; a light absorption layer 6; an optical switching element (a photoconductive layer) 7; spacers 9A and 9B inserted in the display layers 8A and 8B, respectively; and a separation sheet 4 placed between the display layers 8A and 8B, in a layered structure.

The substrate 2 or 3 may be made of glass, silicon, or a film of polymer such as polyester (polyethylene terephthalate), polysulfone, polyethersulfone and polycarbonate. The substrate 2 or 3 is made of a material having insulating property and light transmission property.

The bias electrodes 10 and 11 may be made of an electrically conductive, optically transparent material such as ITO and $SnO_2$ by vapor deposition or sputtering. On its surface, any known functional film such as a liquid crystal alignment film may be formed when necessary.

The separation sheet 4 may be made of a polymer film similarly to the substrate 2 or 3. The separation sheet 4 is made of a material having light transmission properties. Its thickness may be from a few μm to several 10 μm. It preferably has a high dielectric constant for a high potential ratio of the display layers 8A and 8B. On its surface, any known functional film such as a liquid crystal alignment film may be formed when necessary.

The spacers 9A and 9B may each be made of glass or plastic in the shape of a ball or a cylinder. They can control the thickness of the display layers 8A and 8B to a few μm to several 10 μm, respectively. When the substrates 2 and 3 is made of a flexible material, their deformation may change the thickness of the display layers 8A and 8B. Therefore, it is preferable that spacers 9A and 9B contain an adhesive component applied around them and fix each substrate so as to avoid a large change in thickness of the display layers 8A and 8B.

In place of the spacers 9A and 9B, projection parts may be formed on the surfaces of the bias electrodes 10 and 11 or the separation sheet 4 so as to control the thickness of the display layers 8A and 8B.

The light absorption layer 6 may be made of any material that can absorb the incident light coming through the display layers 8A and 8B. Examples of the material include an inorganic material such as CdTe and an insulating material such as a black pigment-containing polymer. The light absorption layer 6 preferably has a high dielectric constant for a high potential ratio of the display layers 8A and 8B.

Applicable examples of the cholesteric liquid crystal constituting the display layers 8A and 8B include a chiral nematic liquid crystal in which an optically active group is incorporated as a moiety of the nematic liquid crystal such as a steroidal cholesterol derivative and a Schiff base type, an azo type, an ester type, or a biphenyl type liquid crystal; and a material in which the above material is mixed as a chiral agent with a nematic liquid crystal having a positive dielectric anisotropy such as a Schiff base type, an azo type, an azoxy type, an ethane type, a biphenyl type, a terphenyl type, a cyclohexyl carboxylate ester type, a phenylcyclohexane type, a benzoate ester type, a pyrimidine type, a dioxane type, a tolan type, a cyclohexylcyclohexane ester type, or an alkenyl type liquid crystal, or any mixture liquid crystal thereof.

The display layers 8A and 8B each contain cholesteric liquid crystals different in threshold voltage and different in wavelength selection from each other so as to selectively reflect visible light beams different in color from each other.

The cholesteric liquid crystal, in which the liquid crystal molecule has a spiral structure, causes selective reflection. In the selective reflection, the light coming to the spiral axis is divided into right-handed circularly polarized light and left-handed circularly polarized light, and the component of the circularly polarized light in the direction of the spiral twist causes Bragg reflection, and the remaining light is transmitted. The center wavelength $\lambda$ of the reflected light and the reflected wavelength width $\Delta\lambda$ are calculated by $\lambda = n \cdot p$ and $\Delta\lambda = \Delta n \cdot p$, respectively, wherein p is the spiral pitch, n is an average index of refraction in the plane perpendicular to the spiral axis, and $\Delta n$ is an index of double refraction. The reflected light from the cholesteric liquid crystal layer shows vivid colors depending on the spiral pitch.

The cholesteric liquid crystal can have three states: a planar state in which the spiral axis is perpendicular to the cell surface so that the selective reflection as described above occurs to the incident light as shown in FIG. 3A; a focal conic state in which the spiral axis is substantially parallel to the cell surface so that the incident light is transmitted while being slightly forward scattered as shown in FIG. 3B; and a homeotropic state in which the spiral structure is loosened so that the liquid crystal director faces in the direction of electric field and the incident light is almost completely transmitted as shown in FIG. 3C.

Among the above three states, the planar and focal conic states can exist in a bistable manner with no voltage applied. Therefore, the orientation state of the cholesteric liquid crystal is not uniquely set by the voltage applied to the liquid crystal layer. When the initial state is planar, the state changes in the order of planar, focal conic and homeotropic, as the applied voltage increases. When the initial state is focal conic, the state changes in the order of focal conic and homeotropic, as the applied voltage increases.

When the voltage applied to the liquid crystal layer sharply becomes zero, the planar or focal conic state is maintained as it is, but the homeotropic state changes into the planar state.

Figure 4:
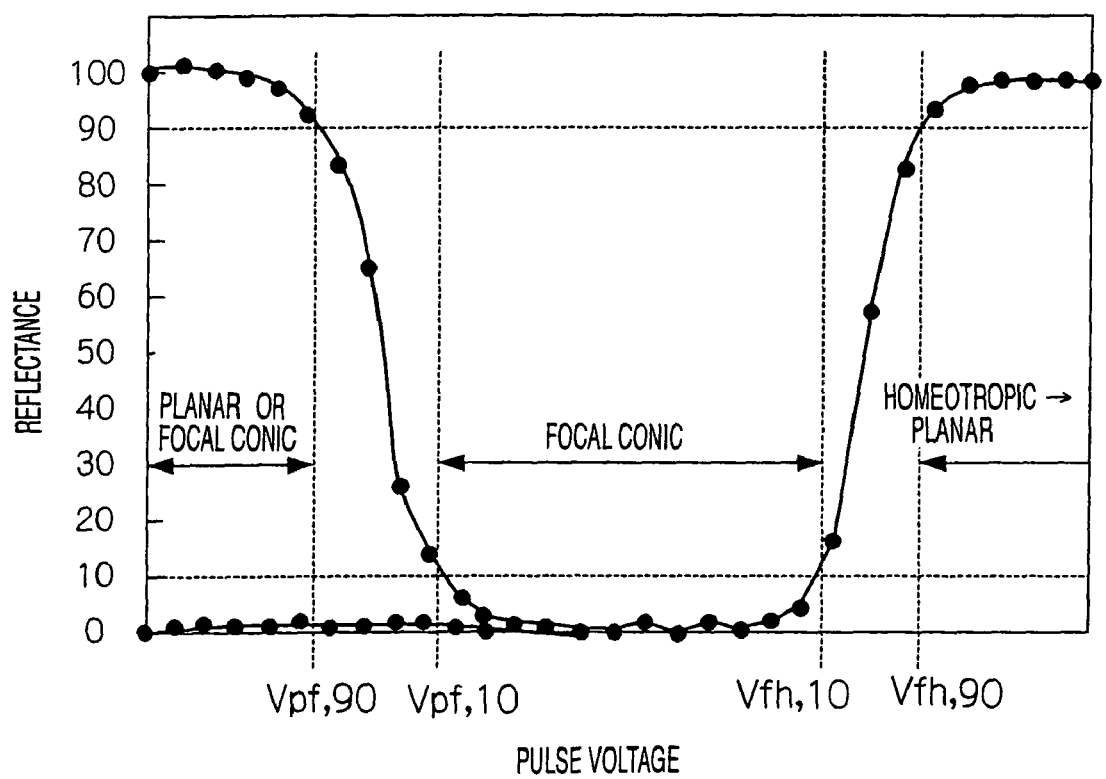
FIG. 4 is a diagram showing an example of the electro-optical response of the cholesteric liquid crystal to pulse signals.

Therefore, the cholesteric liquid crystal layer immediately after the application of a pulse signal shows an electro-optical response as shown in FIG. 4. When the voltage of the applied pulse signal is Vfh 90 or higher, the selective reflection is in such a state that the homeotropic state changes into the planar state. A voltage between Vpf 10 and Vfh 10 provides a focal conic transparent state. When the voltage is Vpf 90 or lower, the state before the application of the pulse signal is continued, namely, the planar selective reflection state or the focal conic transparent state is provided.

For example, as shown in FIG. 1, the optical switching layer (photoconductive layer) 7 has the layered structure comprising upper and lower charge generation layers 35 and 33 and a charge transport layer 34 sandwiched between the layers 35 and 33. However, the optical switching layer is not limited to such a structure.

An image writing device 12 is formed separately from the display medium 1. In this embodiment, it comprises contacts 16 being electrically connected with the bias electrodes 10 and 11 of the display medium 1; a voltage applying unit 13 for applying a bias voltage via the contacts 16 between the bias electrodes 10 and 11 of the display medium 1; a light irradiating unit 14 for applying writing light 17 to the non-display side of the display medium 1; and a control unit 15 for controlling the bias voltage applied from the voltage applying unit 13 between the bias electrodes 10 and 11 of the display medium 1 and for controlling the quantity of the writing light 17 applied from the light irradiating unit 14 to the non-display side of the display medium 1, based on the input image data.

The light irradiating unit 14 may comprise any means that can apply writing light 17 in some quantity. Examples of such means include but are not limited to selfluminous device such as a laser beam scanning device, an LED array, a CRT display, a plasma display, an EL display; and a combination of a light modulating device such as a liquid crystal shutter and a light source such as a fluorescent tube, a xenon lamp, a halogen lamp, and a mercury lamp.

The display mechanism of the color display medium 1 with the cholesteric liquid crystal is described below.

Figure 5:
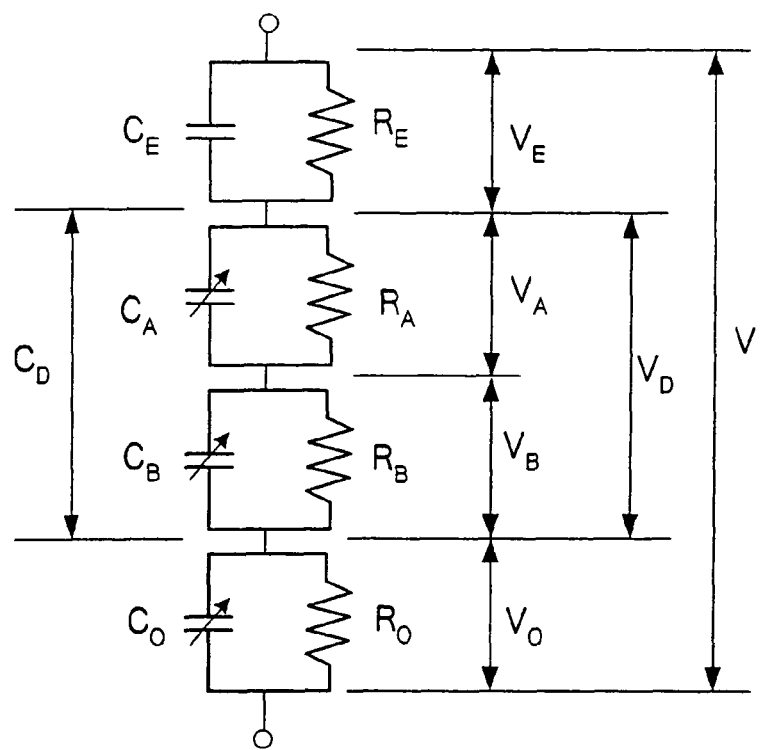
FIG. 5 is a circuit diagram showing an equivalent circuit of a photoaddressable display medium according to the invention.

FIG. 5 shows an equivalent circuit of the display medium 1. In the diagram, $C_E$ and $R_E$ represent an equivalent capacitance and an equivalent resistance, respectively, of the components other than the display layers and the optical switching layer (photoconductive layer). In this embodiment, $C_E$ and $R_E$ represent serial sums of the capacitance and the resistance, respectively, of the separation sheet 4, the light absorption layer 6 and the bias electrodes 10 and 11. $V_E$ represents a voltage drop that is generated in the components other than the display layers and the photoconductive layer when the bias voltage V is applied from the external image writing device 12 between the bias electrodes 10 and 11 of the display medium 1. In general, the components other than the display layers and the photoconductive layer have a sufficiently high equivalent resistance $R_E$ and therefore can be assumed as an insulator.

In the diagram, $C_A$, $C_B$ and $R_A$, $R_B$ represent capacitance values and resistance values of the display layers 8A and 8B, respectively, and $V_A$ and $V_B$ represent voltages actually applied to the display layers 8A and 8B, respectively, under application of the voltage V from the image writing device 12 between the bias electrodes 10 and 11 of the display medium 1. In general, the resistance values $R_A$ and $R_B$ of the display layers 8A and 8B are sufficiently large, and the capacitance values $C_A$ and $C_B$ change depending on the orientation state of the liquid crystal, because the liquid crystal has a dielectric anisotropy.

$C_D$ corresponds to an equivalent capacitance of the whole of the display layers and represents a serial sum of the capacitance values of the display layers 8A and 8B. $V_D$ represents a voltage actually applied to the whole of the display layers under application of the voltage V from the external image writing device 12 between the bias electrodes 10 and 11 of the display medium 1.

In the diagram, $C_0$ and $R_0$ represent a capacitance value and a resistance value of the optical switching layer (photoconductive layer) 7, respectively, and $V_0$ represents a voltage drop that is generated in the optical switching layer (photoconductive layer) 7 when the voltage V is applied from the external image writing device 12 between the bias electrodes 10 and 11 of the display medium 1.

The resistance value $R_0$ of the optical switching layer (photoconductive layer) 7 changes depending on the quantity of the writing light 17 applied to the display medium 1 from the light irradiating unit 14 of the image writing device 12. When the quantity of the writing light 17 is small, the resistance value $R_0$ of the optical switching layer (photoconductive layer) 7 is sufficiently large, and therefore, the voltage $V_D$ actually applied to the whole of the display layers will be defined from the tap capacitance $C_E$, $C_D$ and $C_0$ as follows:

$$V_D = (C/C_D)V \quad (1)$$

$$\text{wherein } C = C_E \cdot C_D \cdot C_0/(C_E \cdot C_D + C_E C_0 + C_D \cdot C_0) \quad (2)$$

When the writing light 17 increases in quantity, the internal photoelectric effect reduces the resistance value $R_0$ of the optical switching layer (photoconductive layer) 7, leading to an increase in the voltage $V_D$ actually applied to the whole of the display layers. In the display medium 1 and the image writing device 12, the quantity of the writing light 17 applied from the light irradiating unit 14 of the image writing device 12 to the display medium 1 is controlled so that the voltage $V_D$ applied to the whole of the display layers can be controlled when the voltage V is applied from the image writing device 12 between the bias electrodes 10 and 11 of the display medium 1.

When the voltage $V_D$ is applied to the whole of the display layers, the voltages $V_A$ and $V_B$ actually applied to the respective display layers 8A and 8B will be as follows:

$$V_A = (C_D/C_A)V_D \quad (3)$$

$$V_B = (C_D/C_B)V_D \quad (4)$$

$$\text{wherein } C_D = C_A \cdot C_B/(C_A + C_B) \quad (5)$$

From the external image writing device 12, a bias voltage V and any quantity of the writing light 17 are applied to the display medium 1, and any voltage $V_D$ is applied to the whole of the display layers. At this time, the voltages according to the tap capacitances as shown above are applied to the display layers 8A and 8B, respectively, so that the orientation state of the cholesteric liquid crystal of each of the display layers 8A and 8B changes depending on the voltages.

In the display medium 1, therefore, if two factors: the distribution ratio of the voltage $V_D$ applied to the whole of the display layers to the respective display layers 8A and 8B; and the electro-optical response of each of the display layers 8A and 8B to the actually applied voltage are controlled, each of the display layers 8A and 8B can make a desired electro-optical response to the voltage $V_D$ applied to the whole of the display layers.

Specifically, the former (the distribution ratio to the respective display layers 8A and 8B) can be controlled by the capacitance ratio between the display layers 8A and 8B as described above. Specifically, the latter (the electro-optical response of each of the display layers 8A and 8B) can be controlled by the dielectric anisotropy, the elastic modulus and the spiral pitch of the cholesteric liquid crystal, which constitutes each of the display layers 8A and 8B. When a polymer is further added, the latter can also be controlled by the degree of the anchoring effect at the interface between the liquid crystal and the polymer, which is influenced by the structure of the polymer or the phase separation process.

Figure 6:
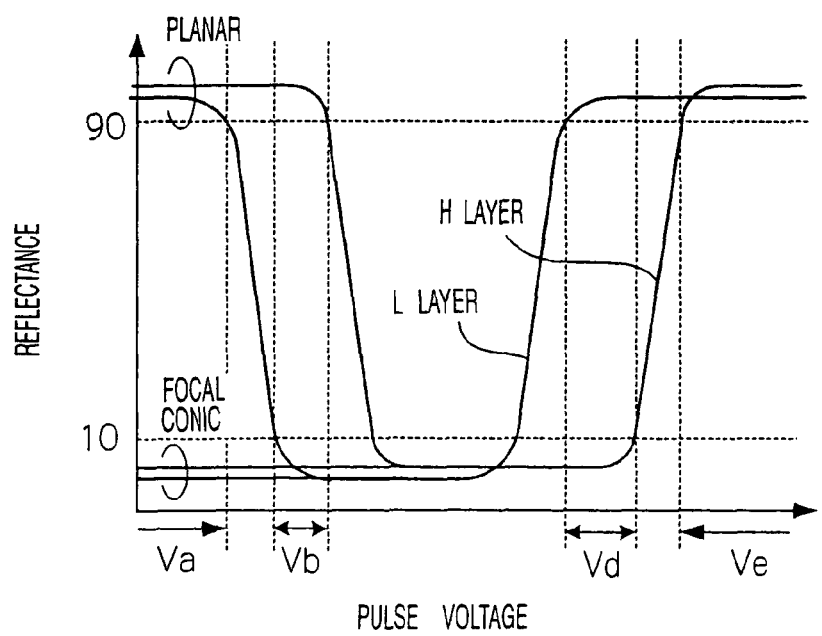
FIG. 6 is a diagram showing the electro-optical response of an example of the photoaddressable display medium according to the invention.

FIG. 6 shows the electro-optical response of each of the display layers 8A and 8B to the pulse voltage $V_D$ applied to the whole of the display layers in the display medium 1.

The display medium 1 is constructed in such a manner that under the same voltage, the two display layers 8A and 8B do not allow both of the transitional region between the planar and focal conic states and the transitional region between the focal conic and homeotropic states. Of the two display layers 8A and 8B, the display layer with a higher threshold voltage is defined as H layer, and that with a lower threshold voltage as L layer. Va corresponds to a voltage of Vpf 90 or less of L layer; Vb corresponds to a voltage between Vpf 10 of L layer and Vpf 90 of H layer; Vd corresponds to a voltage between Vfh 90 of L layer and Vfh 10 of H layer; and Ve corresponds to a voltage Vfh 90 or more of H layer.

The external writing device 12 applies a bias voltage between the bias electrodes 10 and 11 of the display medium 1 as shown in FIG. 7A. The period for the bias voltage application comprises at least a refresh period Tr and a select period Ts of the AC pulse and a display period Td with no voltage thereafter, wherein the voltage Vr at the refresh period Tr is higher than the Vs at the select period Ts (Vr>Vs). The light irradiating unit 14 applies first writing light in such a manner that the application period includes at least an end part of the refresh period Tr and applies second writing light in such a manner that the application period includes at least an end part of the select period Ts, respectively.

When at least the optical switching layer (photoconductive layer) layer 7 of the display medium 1 is unipolar, the bias voltage is applied between the bias electrodes 10 and 11 of the display medium 1 as shown in FIG. 7B. The period for the bias voltage application comprises a refresh period Tr and a select period Ts of the DC pulse and a display period Td with no voltage thereafter, wherein the voltage Vr at the refresh period Tr is higher than the Vs at the select period Ts (Vr>Vs). The light irradiating unit 14 applies first writing light in such a manner that the application period includes at least an end part of the refresh period Tr and applies second writing light in such a manner that the application period includes at least an end part of the select period Ts, respectively.

Figure 8:
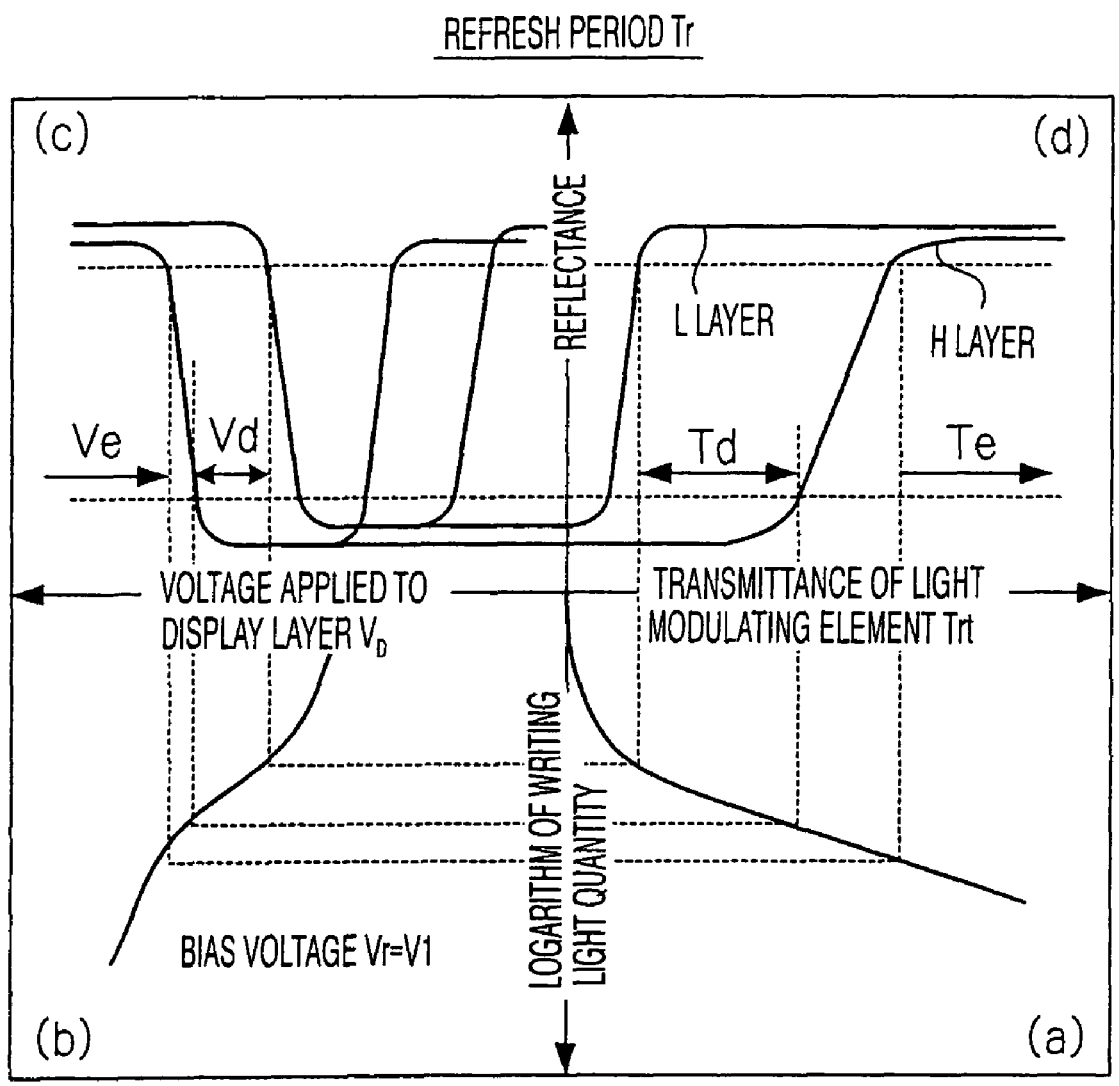
FIG. 8 is a diagram showing changes in the reflectance of each display layer with respect to the transmittance of a light-modulating element that constitutes a light irradiating unit, during a refresh period in the photoaddressable display medium according to the invention.

FIG. 8 shows a change in the reflectance of H and L layers with respect to the transmittance Trt of a light modulating element at the refresh period Tr in the case that the light irradiating unit 14 comprises a combination of the light modulating element and a light source. Part (a) of FIG. 8 shows the relationship between the transmittance Trt of the light modulating element and the logarithm of the quantity of the first writing light; Part (b) shows the relationship between the logarithm of the quantity of the first writing light and the pulse voltage $V_D$ applied to the whole of the display layers; Part (c) shows reflectance of H and L layers against the pulse voltage $V_D$ applied to the whole of the display layers of the display medium 1 in this embodiment as described above referring to FIG. 6; and Part (d) shows a change in the reflectance of H and L layers with respect to the transmittance Trt of the light modulating element of the light irradiating unit 14. In FIG. 6, the voltage on the X-axis increases from the left side to the right side of the graph. In Part (c) of FIG. 8, the voltage increases from the right to the left, and therefore, the graph of Vr is linearly symmetrical about the Y-axis.

Figure 9:
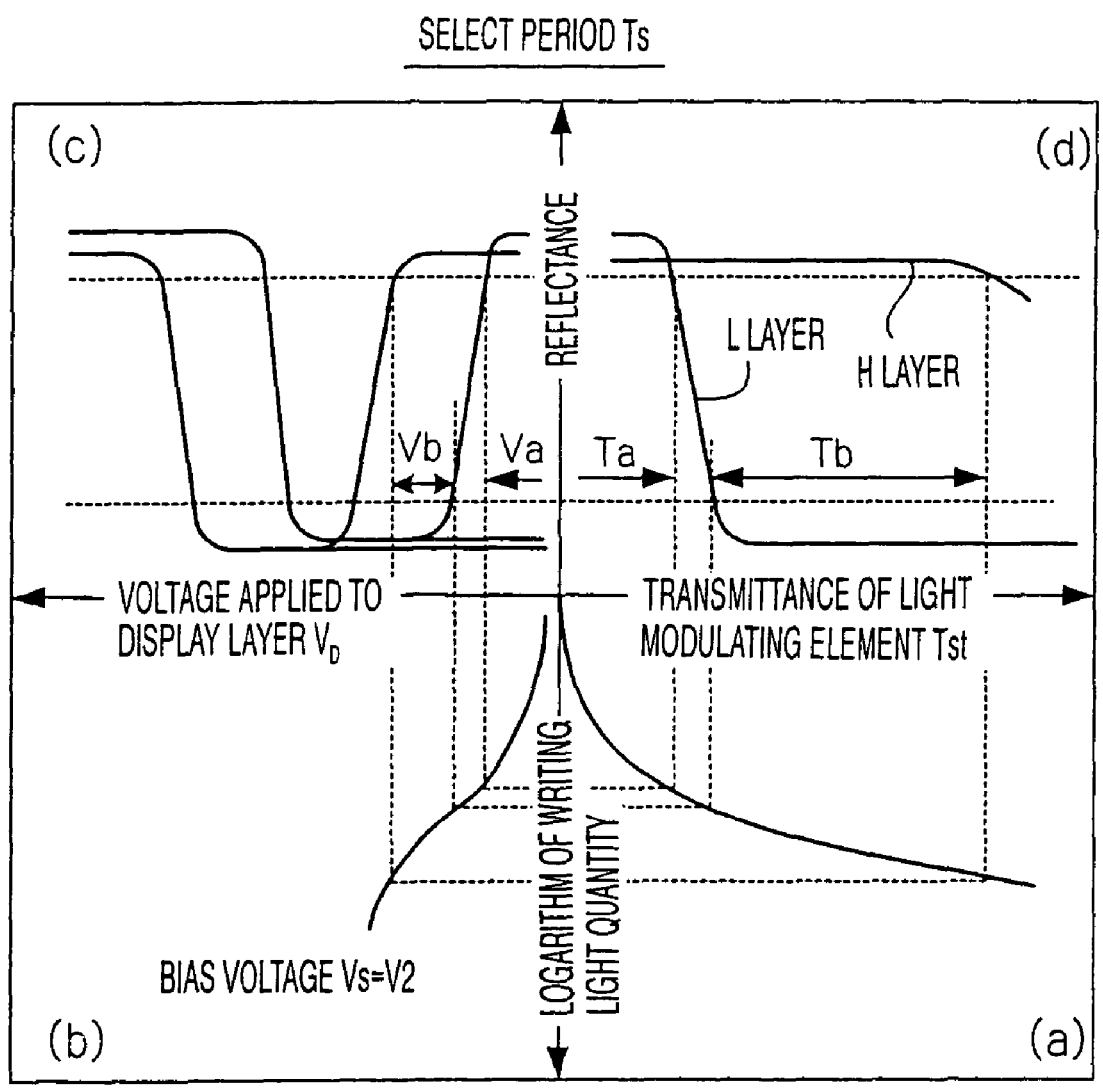
FIG. 9 is a diagram showing changes in the reflectance of each display layer with respect to the transmittance of a light-modulating element that constitutes a light irradiating part, during a select period in the photoaddressable display medium according to the invention.

FIG. 9 shows a change in the reflectance of H and L layers with respect to the transmittance Tst of a light modulating element at the select period Ts in the case that the light irradiating unit 14 comprises a combination of the light modulating element and a light source. Part (a) of FIG. 9 shows the relationship between the transmittance Tst of the light modulating element and the logarithm of the quantity of the second writing light; Part (b) shows the relationship between the logarithm of the quantity of the second writing light and the pulse voltage $V_D$ applied to the whole of the display layers; Part (c) shows reflectance of H and L layers against the pulse voltage $V_D$ applied to the whole of the display layers of the display medium in this embodiment as described above referring to FIG. 6; and Part (d) shows a change in the reflectance of H and L layers with respect to the transmittance Tst of the light modulating element of the light irradiating unit 14.

Figures 10, 11:
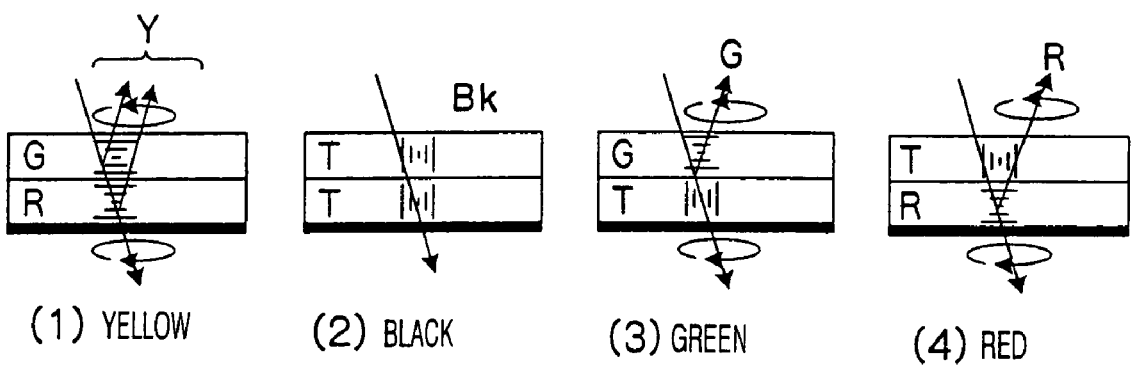
FIG. 10 shows the orientation state of each display layer in the display medium that exhibits the electro-optical response in FIG. 6.
FIG. 11 is a diagram showing the display state of the display medium that exhibits the electro-optical response in FIG. 6.

FIG. 10 shows the orientation state of each of L and H layers under each combination of the voltage and the transmittance as follows. In the refresh period Tr, the bias voltage is set at V1 so that the pulse voltage $V_D$ applied to the whole of the display layers will be Vd or Ve as shown in FIG. 6, and the transmittance Trt of the light modulating element as described above (with respect to the quantity of the first writing light) is set at Td or Te. In the select period Ts, the bias voltage is set at V2 so that the pulse voltage $V_D$ applied to the whole of the display layers will be Va or Vb as shown in FIG. 6, and the transmittance Tst of the light modulating element as described above (with respect to the quantity of the first writing light) is set at Ta or Tb. In FIG. 10, "p" represents the state of selective reflection caused by the planar state, and "f" represents the state of transmission caused by the focal conic state. The orientation state is shown in the order of L and H layers.

FIG. 10 shows that the following four orientation states are obtained: (1) a state in which H and L layers are planar; (2) a state in which H and L layers are focal conic; (3) a state in which H layer is planar, and L layer is focal conic; and (4) a state in which L layer is planar, and H layer is focal conic.

For example, the display layer 8A may be set to be H layer selectively reflecting green light beam, and the display layer 8B may be set to be L layer selectively reflecting red light beam. In such a case, as shown in FIG. 11, wherein "T" indicates that the corresponding layer have a focal conic transmittance state, four display states can be provided as follows: (1) a state in which yellow (Y) is displayed by the writing signal of Vr=V1, Tr=Te, Vs=V2, and Ts=Ta; (2) a state in which black (Bk) is displayed by the writing signal of Vr=V1, Tr=Td, Vs=V2, and Ts=Tb; (3) a state in which green (G) is displayed by the writing signal of Vr=V1, Tr=Te, Vs=V2, and Ts=Tb; and (4) a state in which red (R) is displayed by the writing signal of Vr=V1, Tr=Td, Vs=V2, and Ts=Ta. Therefore, one pixel can display four colors, yellow, black, green, and red. This example shows that two display layers can provide four colors. It will be understood that three display layers can provide eight colors in a similar manner.

In the color display medium using the cholesteric liquid crystal display element as described above, an electric field of 10 V/μm or higher is generally applied to the optical switching layer (photoconductive layer) 7 when the voltage is applied to the medium so as to achieve Vfh 10 or Vfh 90, but an electric field of 10 V/μm or lower, generally about 3 V/μm is applied to the optical switching layer (photoconductive layer) 7 when the voltage is applied to the medium so as to achieve Vpf 10 or Vpf 90 (see FIG. 4). In color display, brightness switching at Vpf 10 or Vpf 90 is required of the optical switching layer (photoconductive layer). The optical switching element of the invention can offer a good performance of on/off driving in an electric field range from high to low. If the optical switching element of the invention is used in such a color display medium, therefore, the dark time can have high resistance as well as high electric field, and the bright time can have assured photoconductivity even in low electric field applied, and therefore, the resistance is not reduced, so that a good color display can be provided.

Figure 12:
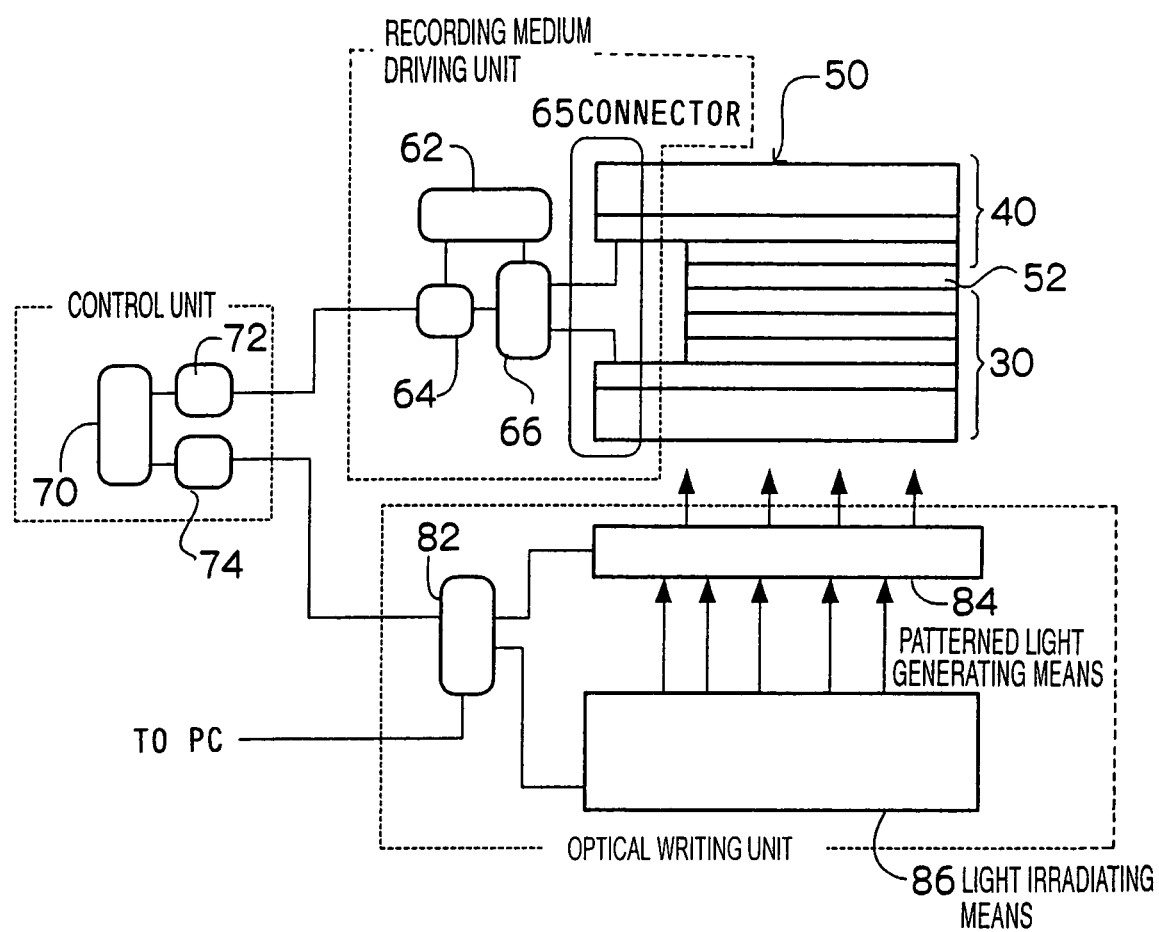
FIG. 12 is a schematic diagram showing a second embodiment of a photoaddressable display medium and an image writing device according to the invention.

Examples of the integration of the optical switching element and the functional element are described below. FIG. 12 shows an embodiment of such integration (a display) including a monochromatic photoaddressable display medium using a cholesteric liquid crystal display element; and an image writing unit.

The display as shown in FIG. 12 comprises a display medium driving unit, a writing unit and a control unit for controlling these units. These units may be integrated into one device or each independently provided.

The display medium driving unit comprises waveform generating means 62, input signal detecting means 64, control means 66, and a connector 65. The connector 65 is used for connecting the transparent electrode of the optical switching element side substrate to the electrode of the display element side substrate. The connector 65 has a contact on each side, and the display medium driving unit can freely be separated from the photoaddressable display medium 50.

Figure 13:
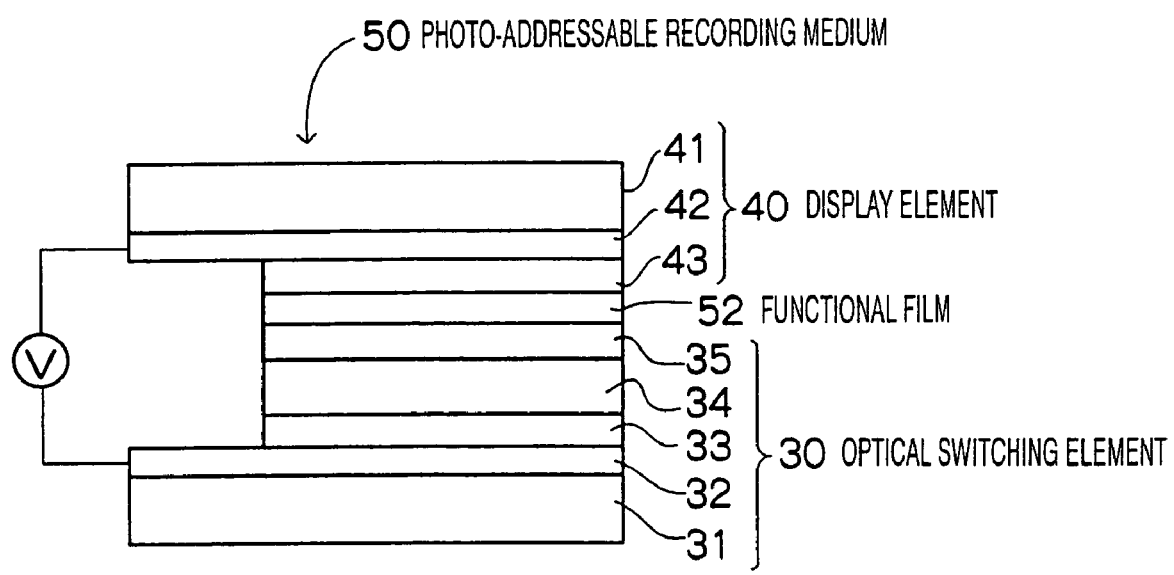
FIG. 13 is a schematic diagram showing a third embodiment of a photoaddressable display medium according to the invention.

The display medium 50 comprises an optical switching element 30, a display element 40 and a functional film 52 sandwiched between the optical switching element 30 and the display element 40. As shown in FIG. 13, the optical switching element 30 comprises a substrate 31, an electrode 32, a lower charge generation layer 33, a charge transport layer 34, and an upper charge generation layer 35. The display element 40 comprises a substrate 41, an electrode 42, and a display layer 43. As shown in the diagram, the upper charge generation layer 35 is placed on the display element side. In the display medium 50, the substrate and the electrode on the first incidence side have to be optically transparent depending on whether the optical writing is performed from the optical switching element side or from the display element side. AC electric field is applied between the electrodes 32 and 42.

In the display medium 50, for example, the optical switching element 30 has a multi-layered structure as shown in FIG. 1, which comprises upper and lower charge generation layers 35 and 33 and a charge transport layer 34 sandwiched between the two charge generation layers 35 and 33. The display layer 43 of the display elements 40 is the same as one of the display layers as shown in FIG. 2.

The optical writing unit comprises control means 82, a patterned light generating means (such as a transmission type TFT liquid crystal display) 84, and light irradiating means (such as a halogen light source) 86, wherein the control means 82 is connected to PC.

The control unit is used for controlling the display medium driving unit and the writing unit and comprises control means 70, driving wave-generating signal output means 72, and optical writing data output means 74.

In this case, the photoaddressable display medium 50 comprises a functional film 52 for eliminating DC component between the optical switching element 30 and the display element 40.

Voltage applying means (not shown), which applies driving pulse for display in synchronization with the optical writing from the optical writing means, includes application pulse generating means and trigger input detecting means for output. The pulse generating means may comprise waveform storing means such as ROM, DA converting means and control means, wherein a waveform read out from the ROM is DA-converted and applied to a spatial modulator device. In place of the ROM, an electric circuit system such as a pulse generating circuit may be used for generating the pulse, or any other means for applying driving pulse may be used without limitation.

The writing unit comprises means for generating patterned light, which will be applied to the first incidence side of the spatial modulator device; and means for applying the patterned light to the spatial modulator device. Applicable examples of the means for generating the pattern include a transmittance type display such as a liquid crystal display using TFT and a simple matrix type liquid crystal display. Any means that can apply light to the spatial modulator device may be used, for example, including a fluorescent light, a halogen lamp and an electroluminescence (EL) light. It will be understood that a luminescence type display, which can serve as both of the pattern generating means and the light irradiating means, is also applicable, including an EL display, CRT and a field emission display (FED). Alternatively, any other means that can control the quantity, wavelength and application pattern of the light being applied to the spatial modulator device may also be used.

In the invention, the way to drive the functional element is not particularly limited. In the driving method, AC voltage, frequency, the quantity of the applied light, and the wavelength may be controlled. AC voltage is applied, wherein the waveform may be sine, rectangular or triangular. Of course, any combination thereof or any other waveform may also be used. In order to improve the display performance and the like, a sub-pulse that cannot perform switching of display by itself may be added to the driving pulse. Depending on the type of the display element, application of a slight bias component may be effective. It will be under stood that such a technique may also be used in the device of the invention.

Even in a monochromatic display medium, when using the above-explained cholesteric liquid crystal display element, a high electric field may be once applied to form a highly reflective planar domain at the front face, and then the planar domain may be selectively made a low reflective focal conic. In such a system, the optical switching element has to be driven in low electric field, since the electric field is used to change the phase from the planar phase to the focal conic phase. Therefore, the optical switching element of the invention is suitable for such a system.

The optical switching element of the invention can effectively be used in the color display medium using the cholesteric liquid crystal to which writing under low electric field is essential. Even in the monochrome display, the optical switching element of the invention can also be effective in terms of energy-saving, because the writing voltage can easily be decreased so as to adapt to a reduced electric field of the on/off threshold of the display medium such as the liquid crystal.

Aspects of the invention are described below.

A first aspect of the invention provides an optical switching element, including at least: a multi-layered optical switching layer that contains a charge generation layer and a charge transport layer; or a mono-layered optical switching layer that has a charge generating function and a charge transporting function, wherein the charge transport layer or the mono-layered optical switching layer contains a charge transporting material represented by the following general formula (1):

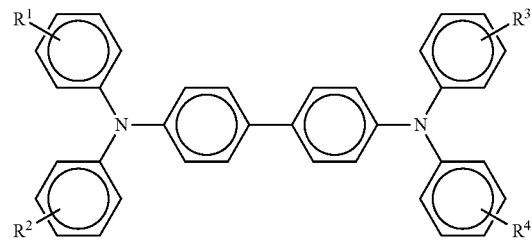

General formula (1)

In general formula (1) $R^1$ and $R^3$ each independently represent $CH_3$ or $C_2H_5$, and $R^2$ and $R^4$ each independently represent H, $CH_3$ or $C_2H_5$.

A second aspect of the invention provides the optical switching element of the first aspect, wherein the charge transporting material represented by general formula (1) is a charge transporting material represented by the following general formula (2):

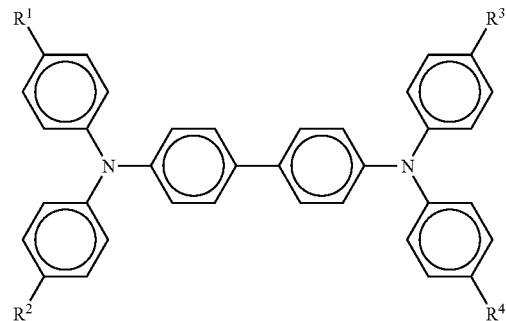

General formula (2)

In general formula (2) $R^1$ and $R^3$ each independently represent $CH_3$ or $C_2H_5$, and $R^2$ and $R^4$ each independently represent H, $CH_3$ or $C_2H_5$.

A third aspect of the invention provides the optical switching element of the second aspect, wherein $R^1$ and $R^3$ each represent $CH_3$, and $R^2$ and $R^4$ each represent $C_2H_5$.

A fourth aspect of the invention provides a device, including: the optical switching element according to any of the first to third aspects; and a functional element electrically connected to the optical switching element.

A fifth aspect of the invention provides a photoaddressable display medium, including: a pair of electrodes, at least one of which has optical transparency; the optical switching element according to any of the first to third aspects; and a display element including a display layer having a memory effect, wherein the optical switching element and the display element are laminated between the pair of electrodes.

A sixth aspect of the invention provides the photoaddressable display medium of the fifth aspect, wherein the display element is a color display element having a plurality of display layers, and each of the plurality of display layers is a cholesteric liquid crystal display layer that selectively reflects visible light beams of a color that is different from the color of the visible light beams selectively reflected by any other one of the plurality of display layers.

A seventh aspect of the invention provides a display device, including: the photoaddressable display medium of the sixth aspect; a unit for driving the display medium; and a unit for optically writing to the display medium.

EXAMPLES

The present invention is more specifically described by way of the examples below, but such examples are not intended to limit the scope of the invention. For the purpose of showing the effect of the charge transporting material (CTM), an optical switching element was prepared in each of Examples 1 to 8, and then the resulting element was measured for impedance characteristics to electric field under application or no application of light. The result was compared with that of a cell of Comparative Example 1 using a conventional CTM. A medium was then prepared using the CTM in each of Examples 9 to 16 and compared with a medium of Comparative Example 2 in the same manner.

Example 1

In the process of forming a charge transport layer, monochlorobenzene was used as a solvent, and a polycarbonate resin manufactured by Mitsubishi Gas Chemical Company, Inc. was used as a binder. The charge transporting material having the following structure (Compound 18) was used, and the loading, i.e. the ratio of the charge transporting material in the solid contents, was set at 60% by weight. A solution with a concentration of 15% was prepared.

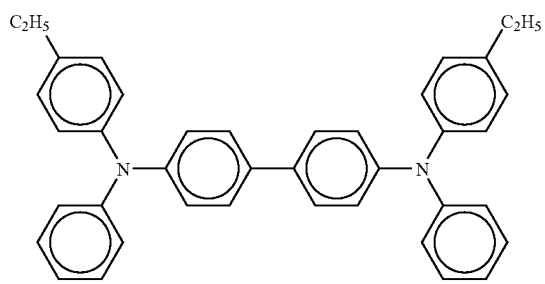

In a solution for forming a charge generation layer, chlorogallium phthalocyanine was used as the charge generating material. Polyvinyl butyral was used as a binder for it and dispersed into a 1-butanol solution by paint shake. The solid content of the chlorogallium phthalocyanine was set at 60% by weight, and that of the polyvinyl butyral was set at 40% by weight. The solvent concentration was set at 4% SC.

The resulting solutions were used to form an optical switching element as shown below.

The solution for the charge generation layer was applied by spin coating on a substrate comprising PET and an ITO electrode formed thereon. The solution was then dried at 100° C. for 1 hour to give a charge generation layer (CGL) with a thickness of 0.2 µm. The 15% SC solution for the charge transport layer was then used and applied by applicator method. The coating was then dried at 100° C. for 1 hour to give a charge transport layer with a thickness of 3 µm. On this film, the solution for the charge generation layer was applied by spin coating and dried at 100° C. for 1 hour to form a charge generation layer with a thickness of 0.2 µm.

On the resulting layer, a 3% SC aqueous solution of polyvinyl alcohol was used and applied by spin coating to form a film with a thickness of 0.2 µm. The resulting film was dried at 100° C. for 30 minutes. On this film, a Au thin film was formed with a thickness of 100 nm by sputtering.

Example 2

The process of Example 1 was used to form an optical switching element except that the charge transporting material used had the structure as shown below (Compound 6) and that gallium phthalocyanine was used as the charge generating material.

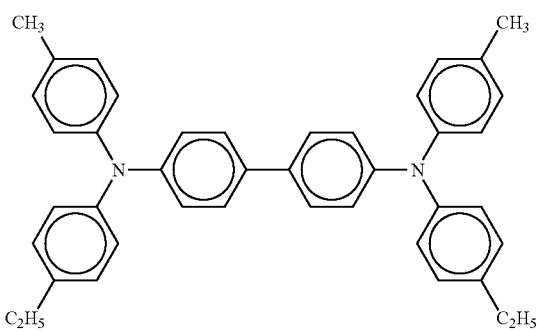

Example 3

The process of Example 1 was used to form an optical switching element except that the charge transporting material used was Compound 6 as shown above and that hydroxyphthalocyanine was used as the charge generating material.

Example 4

The process of Example 1 was used to form an optical switching element except that the charge transporting material used was Compound 6 as shown above, dibromoanthanthrone was used as the charge generating material, and the loading, i.e. the ratio of the charge generating material in the solid contents, was set at 90%.

Example 5

The process of Example 2 was used to form an optical switching element except that the loading of the charge generating material was set at 40%.

Example 6

The process of Example 2 was used to form an optical switching element except that the loading of the charge generating material was set at 50%.

Example 7

The process of Example 2 was used to form an optical switching element except that the loading of the charge generating material was set at 70%.

Example 8

The process of Example 2 was used to form an optical switching element except that the loading of the charge generating material was set at 80%.

Comparative Example 1

The process of Example 1 was used to form an optical switching element except that the charge transporting material having the following structure is used, and chlorogallium phthalocyanine was used as the charge generating material.

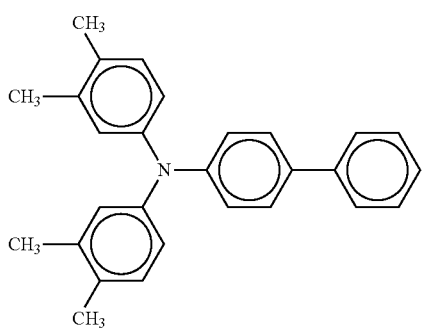

[Evaluation of Examples 1 and 2 and Comparative Example 1]

Figure 14:
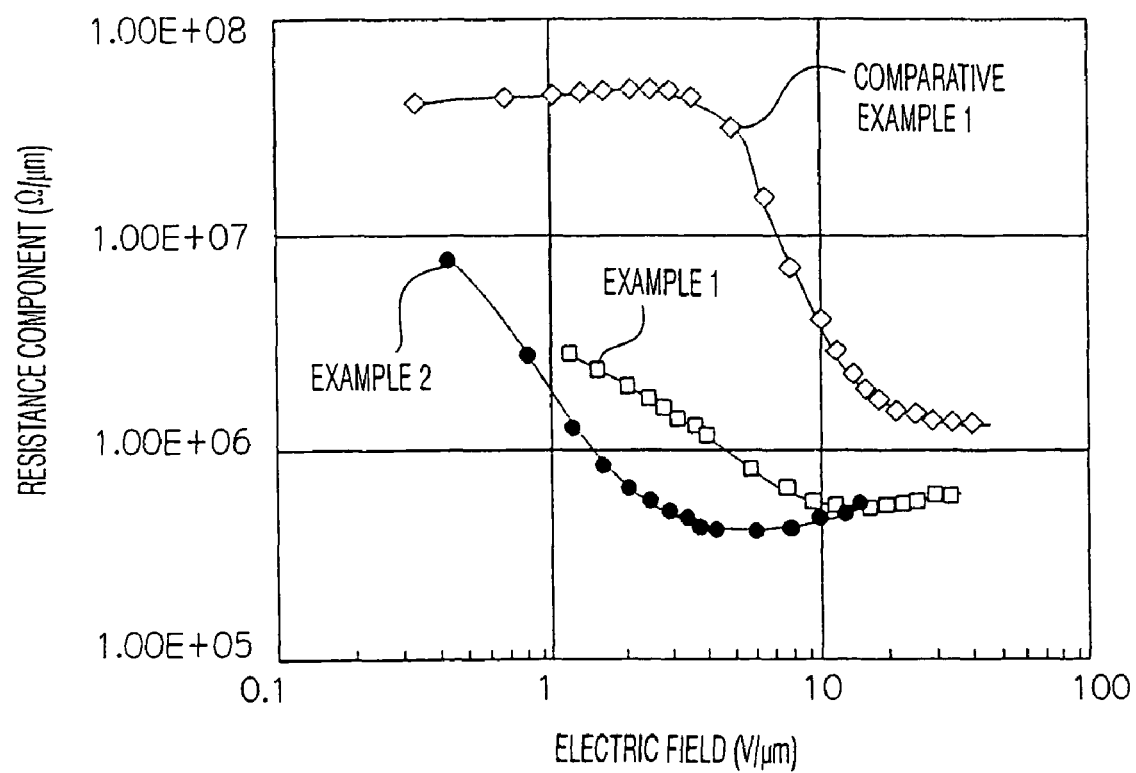
FIG. 14 is a graph showing the evaluation results of Examples 1 and 2 and Comparative Example 1.
Figure 15:
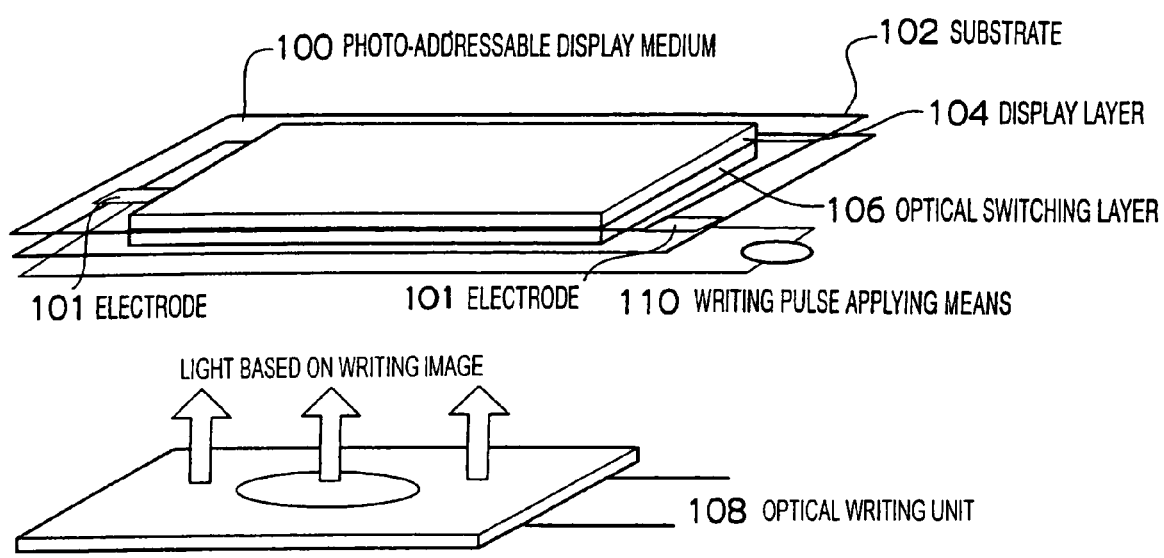
FIG. 15 is a schematic diagram showing an example of a conventional photoaddressable display medium and a conventional image writing device.
Figure 16:
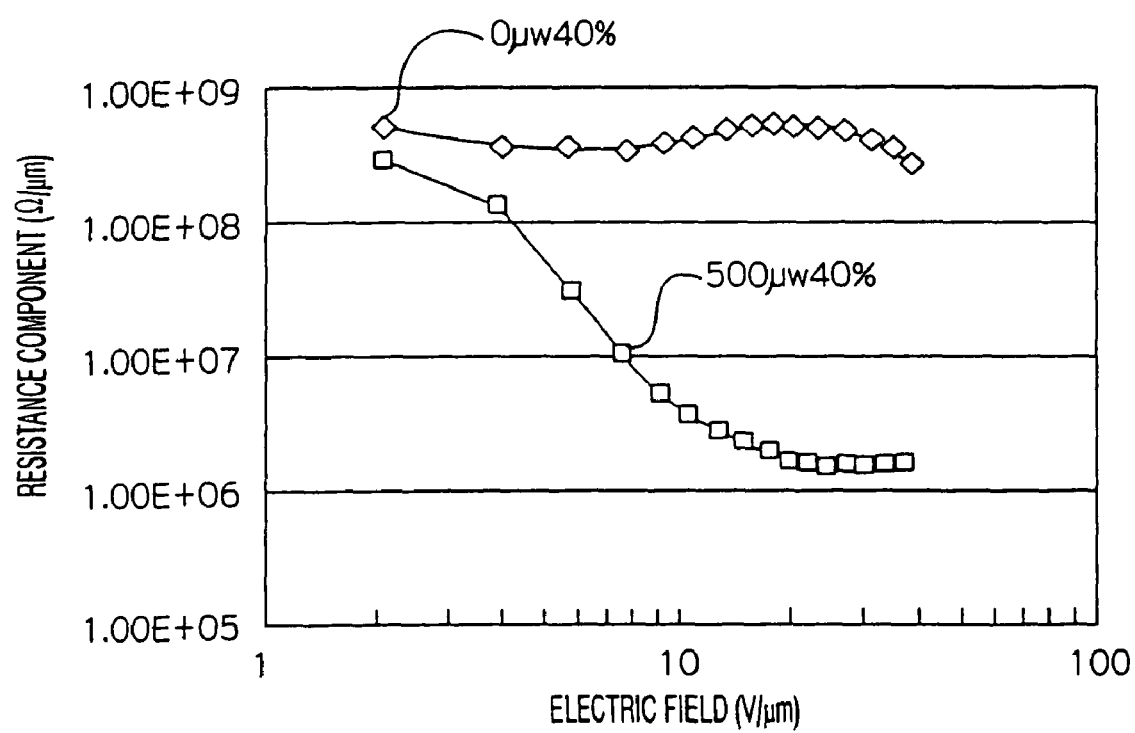
FIG. 16 is a diagram showing the dependence of the resistance on voltage in a conventional optical switching element.

Evaluation was made on impedance characteristics of the resulting test cells and the control cell. Measurement was performed using Solartron Impedance Analyzer 1260 about the dependence on AC voltage. LED of 660 nm was used as the light source, and the switching characteristics were evaluated under the conditions of light quantity of 0 μW/cm² at dark time and 500 μW/cm² at bright time. AC frequency was set at 50 Hz. The results are shown in the graph of FIG. 14. As shown by the results, at dark time, Examples and Comparative Example had a high resistance of 100 MΩ/μm or more and were both applicable as an optical switching cell.

At bright time of 500 μW/cm², however, the switching elements formed using the charge transporting materials of Examples exhibited good characteristics, i.e. low resistance. At 3 V/μm, a significant difference was observed. In particular, when Compound 6 was used as the charge transporting material as in Example 2, the resulting switching element was apparently suitable for on/off switching in low electric field under application/no application of light.

[Evaluation of Examples 3 to 8]

Examples 3 to 8 were evaluated in the same manner. As a result, it was demonstrated that the resulting optical switching elements were effective in a wide range.

TABLE 1

|  | Resistance Value at 3 V/μm | Switching Performance at Low Voltage Driving |
| --- | --- | --- |
| Example 3 | <2 MΩ/μm | Good |
| Example 4 | <2 MΩ/μm | Good |
| Example 5 | <2 MΩ/μm | Good |
| Example 6 | <2 MΩ/μm | Good |
| Example 7 | <2 MΩ/μm | Good |
| Example 8 | <2 MΩ/μm | Good |

Example 9

A color display medium was produced as shown below.

A cholesteric liquid crystal solution for a display layer selectively reflecting a red light beam was prepared as follows: A mixture solution containing 68.6% by weight of a nematic liquid crystal ZLI4520 (Merck) having a positive dielectric anisotropy, 15.7% by weight of a dextro-rotatory chiral agent CB15 (Merck) and 15.7% by weight of a dextro-rotatory chiral agent CE2 (Merck) was prepared. To the mixture solution, 15% by weight of a UV-curable thiol polymer precursor NOA65 (Norland) was added.

A cholesteric liquid crystal solution for a display layer selectively reflecting a green light beam was prepared as follows. A mixture solution containing 72.2% by weight of a nematic liquid crystal E186 (Merck) having a positive dielectric anisotropy, 13.9% by weight of a dextro-rotatory chiral agent CB15 (Merck) and 13.9% by weight of a dextro-rotatory chiral agent CE2 (Merck) was prepared. To the mixture solution, 15% by weight of a UV-curable thiol polymer precursor NOA65 (Norland) was added.

On one inch square of a PET film (Highbeam, Toray Industries, Inc.) 125 μm in thickness with an ITO transparent electrode vapor-deposited by sputtering, a charge generation layer, a charge transport layer and a charge generation layer were formed using the same material and the same method as those in Example 2.

A black resin BKR-105 (Nippon Kayaku Co., Ltd.) was further applied thereon by spin coating and dried at 100° C. for 2 minutes to form a light absorption layer.

Spherical spacers (Haya Beads L-21S (Hayakawa Rubber)) having diameter of 5 μm were wet-dispersed with an adhesive on the resulting light absorption layer. The mixture solution for red reflection was heated at 70° C. and added dropwise onto the light absorption layer. Spherical spacers (Haya Beads L-21S (Hayakawa Rubber)) having diameter of 5 μm were wet-dispersed with an adhesive on one side of a PET film (Lumilar, Toray Industries, Inc.) 4.5 μm in thickness. The PET film was then attached in such a manner that the other surface with no spacers dispersed was brought into contact with the solution.

The mixture solution for green reflection was heated at 70° C. and added dropwise onto the PET film, and spherical spacers (Haya Beads L-21S (Hayakawa Rubber)) having diameter of 5 μm were wet-dispersed with an adhesive on one side. One inch square of a PET film (Highbeam, Toray Industries, Inc.) 125 μm in thickness with an ITO transparent electrode vapor-deposited by sputtering was then attached thereto in such a manner that the surface of the ITO transparent electrode was brought into contact with the liquid crystal.

After heat and pressure were applied using a laminator, UV light of 50 mW/cm² (365 nm) was applied for 60 seconds to the outer light receiving surface of the laminate placed on a hot plate at 70° C. As a result, a color display medium was obtained, in which a blue display layer, a green display layer, and a red display layer each having a PNLC structure were disposed in the order from the outer light receiving side.

Example 10

The process of Example 9 was used to form a display medium except that the charge transporting material was the same as used in Example 1.

Example 11

The process of Example 9 was used to form a display medium except that the charge generating material, the charge transporting material, the binder resin therefor, and the loading were the same as those in Example 3.

Example 12

The process of Example 9 was used to form a display medium except that the charge generating material, the charge transporting material, the binder resin therefor, and the loading were the same as those in Example 4.

Example 13

The process of Example 9 was used to form a display medium except that the loading of the charge transporting material was the same as that in Example 5.

Example 14

The process of Example 9 was used to form a display medium except that the loading of the charge transporting material was the same as that in Example 6.

Example 15

The process of Example 9 was used to form a display medium except that the loading of the charge transporting material was the same as that in Example 7.

Example 16

The process of Example 9 was used to form a display medium except that the loading of the charge transporting material was the same as that in Example 8.

Comparative Example 2

The process of Example 9 was used to form a display medium except that the charge transporting material was the same as used in Comparative Example 1.

[Evaluation of Examples 9 to 16 and Comparative Example 2]

The bias electrodes of the display medium of Example 9 were brought into contact with a pair of aluminum electrodes, which were connected to a pulse generator and a high-voltage power supply unit. Under application of rectangular wave of 400 V, 50 Hz, 250 ms forming AC refresh pulse, writing light was applied while a mask was attached to the non-display side substrate, and the display color was observed. The writing light was applied using an LED back light with a wavelength of 660 nm and a liquid crystal panel. When the quantity of the writing light was 1 mW/cm$^2$, yellow display and red display were provided at a writing light applied part and a no writing light applied part, respectively. After such display was confirmed, rectangular wave of 18 V/µm (calculated from the applied voltage and the film thickness), 50 Hz and 250 ms forming AC select pulse was applied. At the same time, a light applied part and a no light applied part were provided at both of the yellow display region and the green display region, and 3 V/µm (calculated from the applied voltage and the film thickness) was applied. As a result, in the yellow display region, the yellow display was kept at the no light applied part and turned into green display at the light applied part. In the red display region, the red display was turned into black display at the light applied part and kept at the no light applied part.

Examples 10 to 16 were evaluated in the same manner and the resulting optical switching elements thereof also showed good performances.

The display medium of Comparative Example 2 was sandwiched between a pair of aluminum electrodes which were connected to a pulse generator and a high-voltage power supply unit, and writing was attempted in the same manner as Example 9. The AC refresh pulse enabled the yellow display and the red display. However, the AC select pulse was not able to divide the yellow display part into a yellow display region and a red display region under application/no application of light. In an electric field of 3 V/µm, since it was hard to perform writing, the applied voltage was swept. However, both the light applied region and the no light applied region exhibited the same yellow or red color.

Example 17

A monochromic display medium was produced as shown below. A cholesteric liquid crystal solution for a display layer selectively reflecting a green light beam was prepared as follows: A mixture solution containing 72.2% by weight of a nematic liquid crystal E186 (Merck) having a positive dielectric anisotropy, 13.9% by weight of a dextro-rotatory chiral agent CB15 (Merck) and 13.9% by weight of a dextro-rotatory chiral agent CE2 (Merck) was prepared. To the mixture solution, 15% by weight of a UV-curable thiol polymer precursor NOA65 (Norland) was added.

On one inch square of a PET film (Highbeam, Toray Industries, Inc.) 125 µm in thickness with an ITO transparent electrode vapor-deposited by sputtering, a charge generation layer, a charge transport layer and a charge generation layer were formed using the same method as that in Example 2.

A black resin BKR-105 (Nippon Kayaku Co., Ltd.) was further applied thereon by spin coating and dried at 100° C. for 2 minutes to form a light absorption layer.

Spherical spacers (Haya Beads L-21S (Hayakawa Rubber)) having diameter of 5 µm were wet-dispersed with an adhesive on the resulting light absorption layer. The mixture solution for green reflection was heated at 70° C. and added dropwise onto the light absorption layer. Spherical spacers (Haya Beads L-21S (Hayakawa Rubber)) having diameter of 5 µm were wet-dispersed with an adhesive on one side.

One inch square of a PET film (Highbeam, Toray Industries, Inc.) 125 µm in thickness with an ITO transparent electrode vapor-deposited by sputtering was then attached thereto in such a manner that the surface of the ITO transparent electrode was brought into contact with the liquid crystal.

After heat and pressure were applied using a laminator, UV light of 50 mW/cm$^2$ (365 nm) was applied for 60 seconds to the outer light receiving surface of the laminate placed on a hot plate at 70° C. As a result, a monochromic green display medium was obtained, which had a PNLC structured green display layer.

Comparative Example 3

The process of Example 17 was used to form a display medium except that the charge transporting material was the same as used in Comparative Example 1.

[Evaluation of Example 17 and Comparative Example 3]

The bias electrodes of the display medium of Example 17 were brought into contact with a pair of aluminum electrodes, which were connected to a pulse generator and a high-voltage power supply unit. Under application of rectangular wave of 400 V, 50 Hz, 250 ms forming AC refresh pulse, writing light was applied to the front face while a mask was attached to the non-display side substrate. The writing light was applied using an LED back light with a wavelength of 660 nm and a liquid crystal panel, so that green display was provided at the whole face. After such display was confirmed, rectangular wave of 18 V/µm (calculated from the applied voltage and the film thickness), 50 Hz and 250 ms forming AC select pulse was applied. At the same time, a light applied part and a no light applied part were provided, and 3 V/µm (calculated from the applied voltage and the film thickness) was applied. As a result, the green display was kept at the no light applied part and turned into black display at the part where light was applied.

The display medium of Comparative Example 3 was sandwiched between a pair of aluminum electrodes which were connected to a pulse generator and a high-voltage power supply unit, and writing was attempted in the same manner as Example 17. The AC refresh pulse enabled the green display. However, the AC select pulse was not able to divide the green display part into a green display region and a black display region under application/no application of light.

According to the invention, an optical switching element that has an improved optical switching function in low electric field and can offer a good performance of on/off driving over an electric field range from high to low can be provided. The present invention also provides a device, a photoaddressable display medium, and a display each using such an optical switching element.

What is claimed is:

1. A photoaddressable display medium, comprising:
a pair of electrodes, at least one of which has optical transparency;
an optical switching element; and
a display element including a display layer having a memory effect,
wherein
the optical switching element comprises:
a multi-layered optical switching layer that contains a charge generation layer and a charge transport layer; or
a mono-layered optical switching layer that has a charge generating function and a charge transporting function,
wherein the charge transport layer or the mono-layered optical switching layer contains a charge transporting material represented by the following general formula (1):

General formula (1)

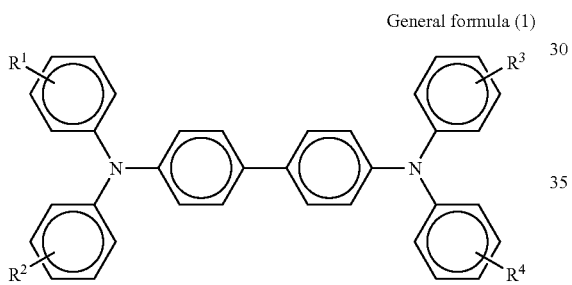

wherein $R^1$ and $R^3$ each independently represent $CH_3$ or $C_2H_5$, and $R^2$ and $R^4$ each independently represent H, $CH_3$ or $C_2H_5$; and
wherein
the optical switching element and the display element are laminated between the pair of electrodes, and
the display element is a color display element having a plurality of display layers relative to the optical switching element, and each of the plurality of display layers is a cholesteric liquid crystal display layer that selectively reflects visible light beams of a color that is different from the color of the visible light beams selectively reflected by any other one of the plurality of display layers.

2. The photoaddressable display medium of claim 1, wherein the charge transporting material is contained in the charge transport layer at a concentration of 30% to 90% by weight.

3. The photoaddressable display medium of claim 1, wherein the charge transporting material is contained in the charge transport layer at a concentration of 45% to 80% by weight.

4. The photoaddressable display medium of claim 1, wherein the charge transporting material is contained in the charge transport layer at a concentration of 50% to 70% by weight.

5. A display device, comprising:
the photoaddressable display medium of claim 1;
a unit for driving the display medium; and
a unit for optically writing to the display medium.

6. A photoaddressable display medium, comprising:
a pair of electrodes, at least one of which has optical transparency;
an optical switching element wherein
the optical switching element comprises:
a multi-layered optical switching layer that contains a charge generation layer and a charge transport layer; or
a mono-layered optical switching layer that has a charge generating function and a charge transporting function,
wherein the charge transport layer or the mono-layered optical switching layer contains a charge transporting material represented by the following general formula (2):

General formula (2)

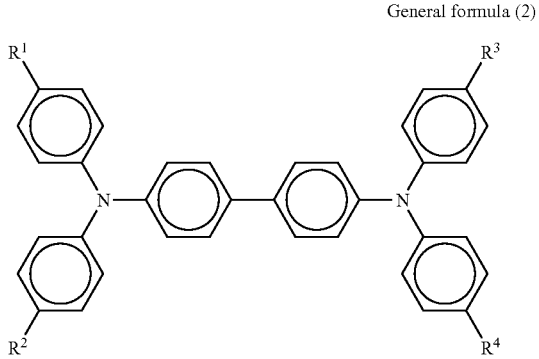

wherein $R^1$ and $R^3$ each independently represent $CH_3$ or $C_2H_5$, and $R^2$ and $R^4$ each independently represent H, $CH_3$ or $C_2H_5$; and
a display element including a display layer having a memory effect,
wherein
the optical switching element and the display element are laminated between the pair of electrodes, and
the display element is a color display element having a plurality of display layers relative to the optical switching element, and each of the plurality of display layers is a cholesteric liquid crystal display layer that selectively reflects visible light beams of a color that is different from the color of the visible light beams selectively reflected by any other one of the plurality of display layers.

7. A display device, comprising:
the photoaddressable display medium of claim 6;
a unit for driving the display medium; and
a unit for optically writing to the display medium.

8. The photoaddressable display medium of claim 6, wherein $R^1$ and $R^3$ each represent $CH_3$, and $R^2$ and $R^4$ each represent $C_2H_5$.

9. A display device, comprising:
the photoaddressable display medium of claim 8;
a unit for driving the display medium; and
a unit for optically writing to the display medium.

10. The photoaddressable display medium of claim 6, wherein the charge transporting material is contained in the charge transport layer at a concentration of 30% to 90% by weight.

11. The photoaddressable display medium of claim 6, wherein the charge transporting material is contained in the charge transport layer at a concentration of 45% to 80% by weight.

12. The photoaddressable display medium of claim 6, wherein the charge transporting material is contained in the charge transport layer at a concentration of 50% to 70% by weight.

* * * * *